(12) United States Patent
Greiner et al.

(10) Patent No.: US 8,751,775 B2
(45) Date of Patent: *Jun. 10, 2014

(54) NON-QUIESCING KEY SETTING FACILITY

(75) Inventors: Dan F. Greiner, San Jose, CA (US); Christian Jacobi, Poughkeepsie, NY (US); Chung-Lung K. Shum, Wappingers Falls, NY (US); Timothy J. Slegel, Staatsburg, NY (US)

(73) Assignee: International Business Machines Corporation, Armonk, NY (US)

( * ) Notice: Subject to any disclaimer, the term of this patent is extended or adjusted under 35 U.S.C. 154(b) by 88 days.

This patent is subject to a terminal disclaimer.

(21) Appl. No.: 13/452,248

(22) Filed: Apr. 20, 2012

(65) Prior Publication Data

US 2012/0204010 A1    Aug. 9, 2012

Related U.S. Application Data

(63) Continuation of application No. 12/638,314, filed on Dec. 15, 2009.

(51) Int. Cl.
*G06F 12/14* (2006.01)
*G06F 9/44* (2006.01)

(52) U.S. Cl.
CPC ............... *G06F 9/44* (2013.01); *G06F 9/4418* (2013.01)
USPC ......................................... 712/225; 714/100

(58) Field of Classification Search
CPC ... G06F 12/145; G06F 9/4418; G06F 9/4856; G06F 9/30087; G06F 9/30094; G06F 9/30101; G06F 9/466; G06F 9/467; G06F 9/44
See application file for complete search history.

(56) References Cited

U.S. PATENT DOCUMENTS

| | | | |
|---|---|---|---|
| 5,008,811 | A | 4/1991 | Scalzi et al. |
| 5,551,013 | A | 8/1996 | Beausoleil et al. |
| 5,574,873 | A | 11/1996 | Davidian |
| 5,790,825 | A | 8/1998 | Traut |
| 5,966,515 | A | 10/1999 | Alferness |
| 6,009,261 | A | 12/1999 | Scalzi et al. |
| 6,079,013 | A | 6/2000 | Webb et al. |
| 6,088,792 | A | 7/2000 | Slegel et al. |

(Continued)

OTHER PUBLICATIONS

Office Action for U.S. Appl. No. 12/638,314 dated Oct. 2, 2012.

(Continued)

*Primary Examiner* — Eric Coleman
(74) *Attorney, Agent, or Firm* — John E. Campbell; Blanche E. Schiller, Esq.; Heslin Rothenberg Farley & Mesiti P.C.

(57) ABSTRACT

A non-quiescing key setting facility is provided that enables manipulation of storage keys to be performed without quiescing operations of other processors of a multiprocessor system. With this facility, a storage key, which is accessible by a plurality of processors of the multiprocessor system, is updated absent a quiesce of operations of the plurality of processors. Since the storage key is updated absent quiescing of other operations, the storage key may be observed by a processor as having one value at the start of an operation performed by the processor and a second value at the end of the operation. A mechanism is provided to enable the operation to continue, avoiding a fatal exception.

15 Claims, 19 Drawing Sheets

(56) References Cited

U.S. PATENT DOCUMENTS

| | | | |
|---|---|---|---|
| 6,119,219 | A | 9/2000 | Webb et al. |
| 6,308,255 | B1 | 10/2001 | Gorishek, IV et al. |
| 6,463,582 | B1 | 10/2002 | Lethin et al. |
| 6,996,698 | B2 | 2/2006 | Slegel et al. |
| 7,020,761 | B2 | 3/2006 | Siegel et al. |
| 8,140,834 | B2 * | 3/2012 | Heller et al. ............ 712/244 |
| 8,572,624 | B2 | 10/2013 | Heller et al. |
| 2006/0036824 | A1 | 2/2006 | Greiner et al. |
| 2006/0036924 | A1 | 2/2006 | Ghosh |
| 2009/0187724 | A1 | 7/2009 | Greiner et al. |
| 2009/0192966 | A1 | 7/2009 | Horvitz et al. |
| 2009/0193214 | A1 | 7/2009 | Greiner et al. |
| 2011/0145550 | A1 | 6/2011 | Greiner et al. |

OTHER PUBLICATIONS

"z/Architecture Principles of Operation," IBM Publication No. SA22-7832-07, Feb. 2009.

International Search Report and Written Opinion for PCT/EP/1010/069465 dated May 6, 2011.

"z/Architecture—Principles of Operation," SA22-7832-00, First Edition, Dec. 2000, pp. 3-8 thru 3-12.

"The Hercules System/370, ESA/390, and z/Architecture Emulator," http://www.hercules-390,org/, retrieved from internet Mar. 25, 2013, pp. 1-6.

Office Action for U.S. Appl. No. 12/538,314 dated Nov. 25, 2013, pp. 1-10.

Fundamental Software Inc., "The New Mainframe", www.funsoft.com. (retrieved from internet Nov. 14, 2013), 12 pages.

\* cited by examiner

NON-QUIESCING KEY SETTING FACILITY

This application is a continuation of U.S. Ser. No. 12/638,314, entitled "NON-QUIESCING KEY SETTING FACILITY," filed Dec. 15, 2009, which is hereby incorporated herein by reference in its entirety.

BACKGROUND

This invention relates, in general, to facilitating processing within a computing environment, and in particular, to facilitating processing associated with setting storage keys used within the computing environment.

Storage keys are employed in computing environments, such as multiprocessor systems based on the z/Architecture® of International Business Machines Corporation, Armonk, N.Y., to facilitate processing within the environment. As one example, a storage key is associated with each block of real storage (also referred to as a frame). Such key association provides a reliability mechanism that is used to segregate blocks of storage, ensuring that programs executing in one key do not improperly store into or, subject to a control in the key, fetch from blocks having a different key. A storage key may also provide indications to an operating system as to which blocks have been referenced and changed, thus allowing the operating system to determine which blocks may need to be written to auxiliary storage.

A storage key may be set (updated) by instructions executing within the computing environment. As examples, in the z/Architecture®, a Set Storage Key Extended instruction and a Perform Frame Management Function instruction manipulate the storage key, which is accessible by multiple processors of the computing environment.

To improve system performance, a processor may buffer a subset of the storage keys in a local (processor-specific) area. However, when a storage key is set (which may or may not change the actual key value), then typically all processors in the multiprocessor configuration are to effectively observe the change simultaneously, such that stale local copies of the key are discarded. To facilitate this processing, a quiesce operation is performed, in which the initiator of the instruction to manipulate the storage key sends a quiesce signal to the other processors of the computing environment. In response to receiving the signal, the other processors quiesce their processing, purge locally cached copies of the key, and acknowledge the same. When all the processors that received the quiesce signal have acknowledged, the initiator sets the storage key to a desired value, and sends an unquiesce signal to the other processors, so that the other processors can resume execution.

BRIEF SUMMARY

The quiesce operation used when storage keys are updated negatively impacts system performance. Thus, in accordance with an aspect of the present invention, a facility is provided that enables the manipulation of storage keys without quiescing the other processors that may observe the storage key. It is no longer necessary for all the processors to effectively observe the change simultaneously.

The shortcomings of the prior art are overcome and additional advantages are provided through the provision of a method of facilitating processing in a computing environment. The method includes, for instance, executing by a processor of the computing environment a machine instruction, the machine instruction specifying a nonquiescing control (NQ), a storage key, and one or more values to be used to set the storage key, the storage key being associated with a block of storage, and wherein the executing includes: based on the NQ being a first value, performing a)-c) including: a) initiating quiesce of other processors of the computing environment capable of accessing the storage key during execution of the machine instruction; b) based on the other processors reaching a quiesce point, storing at least one value of the one or more values in the storage key associated with the block of main storage; and c) initiating an end to the quiesce; and based on the NQ being a second value, storing at least one value of the one or more values in the storage key associated with the block of main storage absent quiescing other processors of the computing environment capable of accessing said storage key.

Additional features and advantages are realized through the techniques of the present invention. Other embodiments and aspects of the invention are described in detail herein and are considered a part of the claimed invention.

BRIEF DESCRIPTION OF THE SEVERAL VIEWS OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

In accordance with an aspect of the present invention, a non-quiescing key setting facility is provided that enables manipulation of storage keys to be performed without quiescing operations of other processors of a multiprocessor system. With this facility, a storage key, which is accessible by a plurality of processors of the multiprocessor system, is updated absent a quiesce of operations of the plurality of processors. Since a storage key is updated absent quiescing the other operations, the storage key may be observed by a processor as having one value at the start of an operation performed by the processor and a second value at the end of the operation. This is managed, in accordance with an aspect of the present invention, in which a mechanism is provided to enable the operation to continue, avoiding a fatal exception.

The storage key is, for instance, a control structure having various fields, or it can be any property or resource used to protect storage. Storage, as used herein, refers to memory of a computer system, such as central or main memory, and/or cache memory. Quiescing is, for instance, a means of serialization that may be performed to ensure that updates to a configuration-wide resource are immediately visible to the CPUs of the configuration. A quiescing operation initiated by one CPU causes the following to occur on the other CPUs in the configuration: any instruction or unit of operation executing on the CPU is completed; locally-cached copies of the configuration-wide resource being updated are discarded; and resumption of instruction execution is delayed until the update to the configuration-wide resource is visible to the CPUs.

In one embodiment, the non-quiescing facility is implemented for instructions that have previously required quiescing. As examples, the Set Storage Key Extended (SSKE) instruction and Perform Frame Management Function (PFMF) instruction offered by International Business Machines Corporation have traditionally required quiescing to perform an update of a storage key. However, in accordance with an aspect of the present invention, these instructions, and possibly others, may selectively be implemented as non-quiescing. In one aspect of the present invention, each instruction can execute in both modes of processing (quiescing and non-quiescing), and the particular mode to be used on a given execution of the instruction is selected via setting an indicator in the instruction.

Figure 1A:
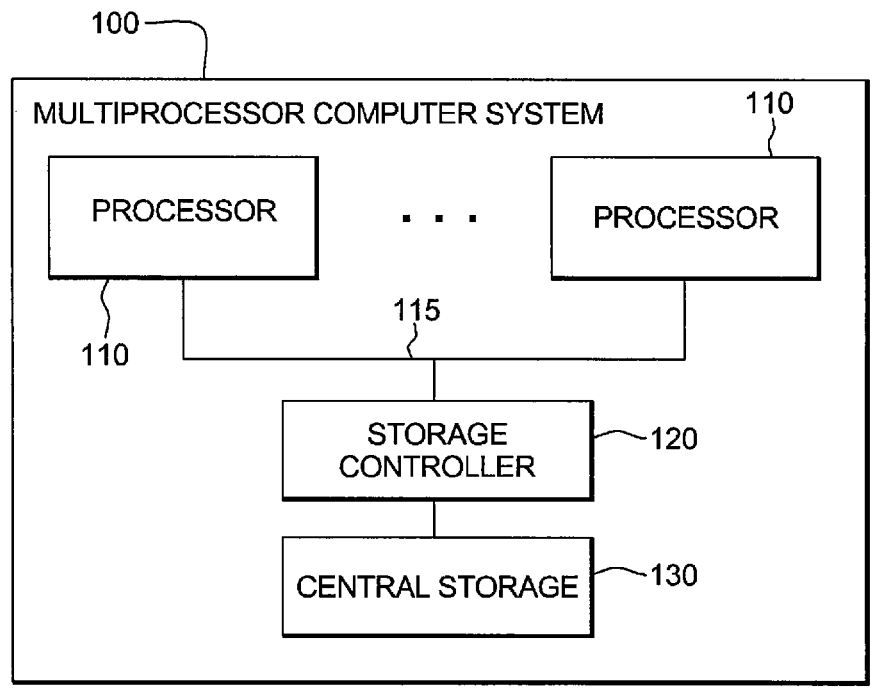
FIG. 1A depicts one embodiment of a computing environment to incorporate and use one or more aspects of the present invention.

One embodiment of a computing environment to incorporate and use one or more aspects of the present invention is described with reference to FIG. 1A. As one example, the computing environment is a multiprocessor system, such as a Symmetric Multiprocessor System (SMP), based on the z/Architecture® offered by International Business Machines Corporation, Armonk, N.Y. As one particular example, the system is a System Z® server offered by International Business Machines Corporation. The z/Architecture® is described in an IBM® publication entitled, "z/Architecture® Principles of Operation," IBM Publication No. SA22-7832-07, February 2009, which is hereby incorporated herein by reference in its entirety. IBM®, z/Architecture® and System Z® are registered trademarks of International Business Machines Corporation, Armonk, N.Y., U.S.A. Other names used herein may be registered trademarks, trademarks or product names of International Business Machines Corporation or other companies.

Figure 1B:
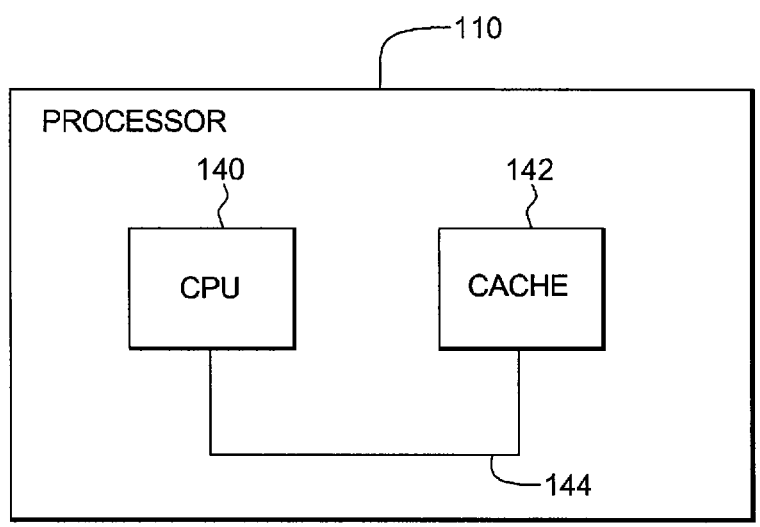
FIG. 1B depicts one example of a processor of the computing environment of FIG. 1A, in accordance with an aspect of the present invention.

As one example, multiprocessor system 100 includes multiple processors 110, a storage controller 120 and a central storage 130. Processors 110 are coupled to one another and to central storage 130 via one or more buses 115 and storage controller 120. Each processor, as shown in FIG. 1B, includes, for instance, a central processing unit (CPU) 140 that may be coupled to a local cache 142 via, for instance, one or more buses or other connections 144.

Figure 1C:
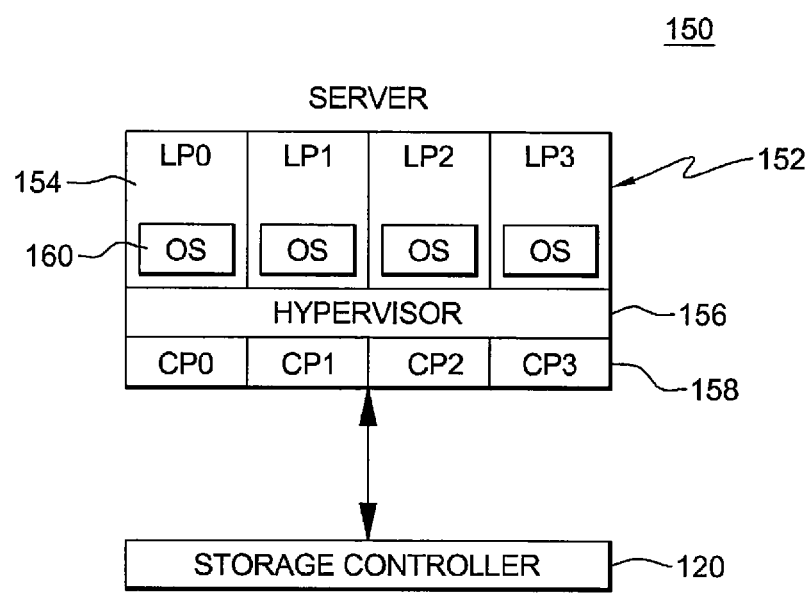
FIG. 1C depicts one example of a logically partitioned system that may incorporate and use one or more aspects of the present invention.

In another embodiment, the system includes one or more partitions or zones. For example, the system is a logically partitioned System Z® server offered by International Business Machines Corporation. In this example, as depicted in FIG. 1C, a server 150 includes, for instance, one or more partitions or zones 152 (e.g., logical partitions LP0-LP3), a hypervisor 156 (e.g., a logical partition manager), and one or more central processors 158 (e.g., CP0-CP3). Although four partitions and four central processors are shown, the system may include more or less partitions and/or more or less central processors.

Each logical partition 152 is capable of functioning as a separate system. That is, each logical partition can be independently reset, initially loaded with an operating system, if desired, and operate with different programs. An operating system or application program running in a logical partition appears to have access to a full and complete system, but in reality, only a portion of it is available. A combination of hardware and Licensed Internal Code (also referred to as microcode and Millicode) keeps a program in a logical partition from interfering with a program in a different logical partition. This allows several different logical partitions to operate on a single or multiple physical processors in a time sliced manner. In this particular example, each logical partition has a resident operating system 160, which may differ for one or more logical partitions. In one embodiment, operating system 160 is the z/OS® operating system, offered by International Business Machines Corporation, Armonk, N.Y. z/OS® is a registered trademark of International Business Machines Corporation, Armonk, N.Y.

Each logical partition may include one or more central processors. Central processors 158 are physical processor resources that are allocated to the logical partitions. For instance, a logical partition 152 includes one or more logical processors, each of which represents all or a share of a physical processor resource allocated to the partition.

Logical partitions 152 are managed by hypervisor 156 implemented by microcode running on processors 158. Logical partitions 152 and hypervisor 156 each comprise one or more programs residing in respective portions of central storage associated with the central processors. One example of hypervisor 156 is the Processor Resource/Systems Manager (PR/SM), offered by International Business Machines Corporation, Armonk, N.Y.

In one embodiment, the server is coupled to a storage controller 170, which includes centralized logic responsible for arbitrating between different processors issuing requests. For instance, when controller 170 receives a request, it determines that the requestor is the initiator for that request and that the other processors are receivers; it broadcasts messages; and otherwise, handles requests. Further details regarding a storage controller (e.g., storage controller 120 or storage controller 170) are described with reference to FIG. 2.

Figure 2:
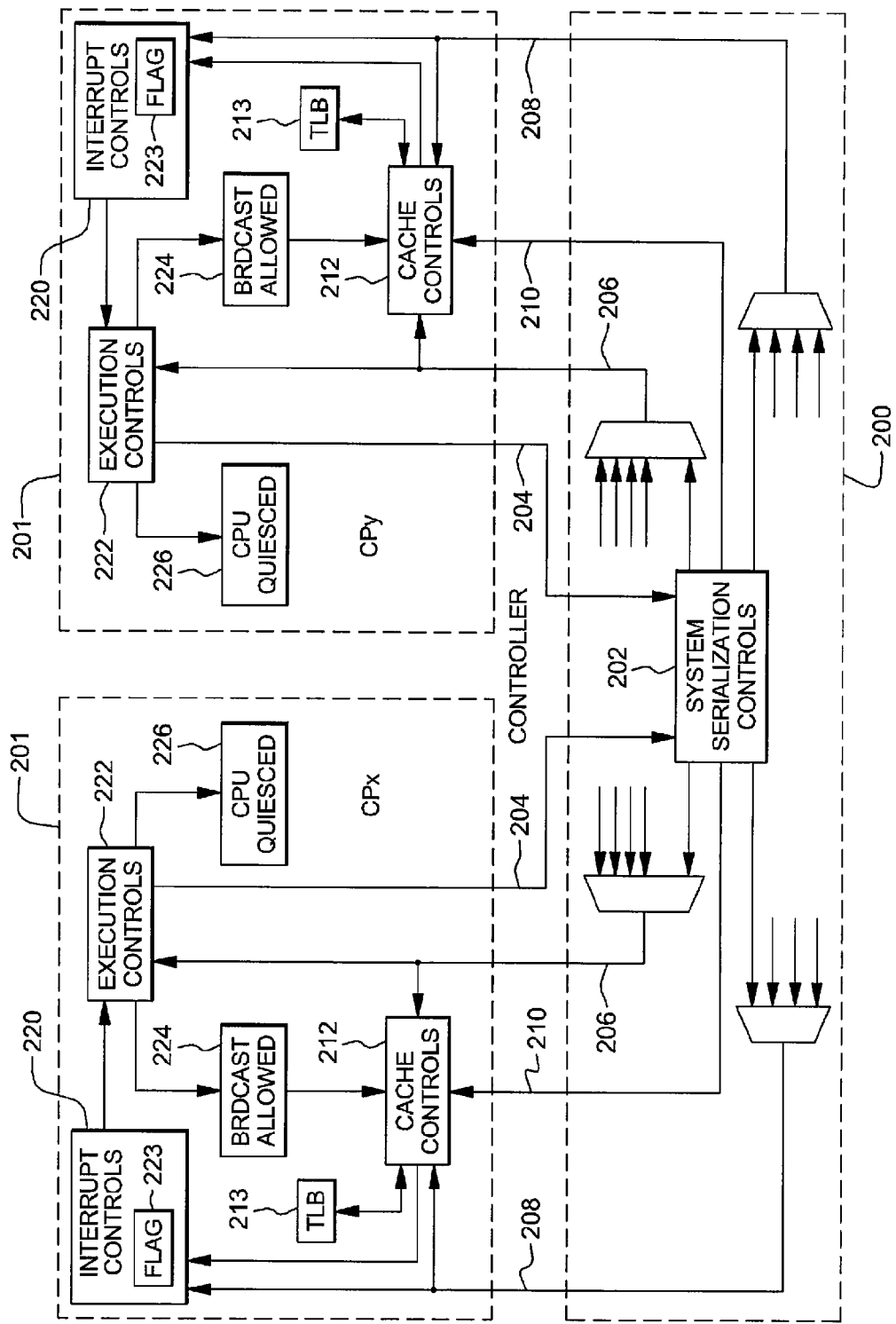
FIG. 2 depicts one embodiment of further details associated with a controller of FIG. 1A or FIG. 1C, in accordance with an aspect of the present invention.

FIG. 2 depicts one example of a controller 200 coupled to a plurality of processors (CPUs) 201. In this example, two central processors are depicted. However, it will be understood that more than two processors may be coupled to controller 200. Controller 200 includes various controls, and one such control is, for instance, system serialization controls 202. The system serialization controls are used to ensure that operations that are to be serialized, such as update operations, are serialized, in that only one such operation (or a limited number) is in progress at one time in the computing environment. It also monitors the sequence of events for that operation and is part of the mechanism that implements the quiesce function.

Controller 200 is coupled to each central processor via various interfaces. For instance, an interface 204 is used by the Licensed Internal Code in a central processor to send "control" commands to the controller, which specify an action to be taken, and to send "sense" commands, which return information from the controller. Another interface is a response bus 206, which is used to return information from the controller for the "sense" commands. The response bus is also used to communicate command status for "control" commands, and may be set from a plurality of sources within the controller, including the system serialization controls. A central processor can use this interface to sense the state of the system serialization controls in controller 200.

A further interface is interface 208, which is used by the controller to send commands to each processor. This may also be controlled from a plurality of sources within the controller, including system serialization controls 202. A yet further interface is interface 210, which provides signals to cache controls 212 of central processor 201. Cache controls 212 process commands, in response to the signals. In one example, cache controls 212 process commands that affect one or more buffers, such as Translation Lookaside Buffers (TLBs) 213.

In addition to cache controls 212, processor 201 includes various other controls, including for instance, interrupt controls 220 and execution controls 222. In response to particular events, interrupt controls 220 cause an internal interruption to be pending in the CPU, which in turn, causes execution controls 222 to suspend program instruction processing, at the next interruptible point. In accordance with an aspect of the present invention, interrupt controls 220 includes a flag 223 used to determine if a protection exception is to be blocked, as described below.

Responsive to the interruption, execution controls 222 invokes a Licensed Internal Code routine to set a broadcast operation allowed latch 224 to enable cache controls 212 to process pending commands.

Central processor 201 also includes a CPU quiesced latch 226 that indicates whether or not the central processor is quiesced.

The above-described computing environments are only examples. Many variations are possible without departing from the spirit of the present invention. For example, the environment need not be based on the z/Architecture®, but instead, can be based on other architectures offered by Intel, Sun Microsystems, as well as others. Moreover, an environment may include an emulator (e.g., software or other emulation mechanisms) in which a particular architecture or a subset thereof is emulated. In such an environment, one or more emulation functions of the emulator can implement one or more aspects of the present invention, even though a computer executing the emulator may have a different architecture than the capabilities being emulated. As one example, in emulation mode, the specific instruction or operation being emulated is decoded, and an appropriate emulation function is built to implement the individual instruction or operation.

Further details of an emulation environment are described with reference to FIG. 3. As one example, a host computer 300 is capable of emulating another architecture and/or processing capabilities of another computer. For instance, host computer 300 is based on an Intel architecture; a RISC architecture, such as PowerPC; a SPARC architecture, offered by Sun Microsystems; or another architecture, and is capable of emulating the z/Architecture® of IBM® or another architecture of IBM® or another entity.

Host computer 300 includes, for instance, a memory 302 to store instructions and data; an instruction fetch unit 304 to fetch instructions from memory 302, and to optionally, provide local buffering for the fetched instructions; an instruction decode unit 306 to receive instructions from instruction fetch unit 304 and to determine the type of instructions that have been fetched; and an instruction execution unit 308 to execute the instructions. Execution may include loading data into a register from memory 302; storing data back to memory from a register; or performing some type of arithmetic or logical operation, as determined by the decode unit.

In one example, each unit described above is implemented in software. For instance, the operations being performed by the units are implemented as one or more subroutines within emulator software. In another example, one or more of the operations are implemented in firmware, hardware, software or some combination thereof.

Figure 3:
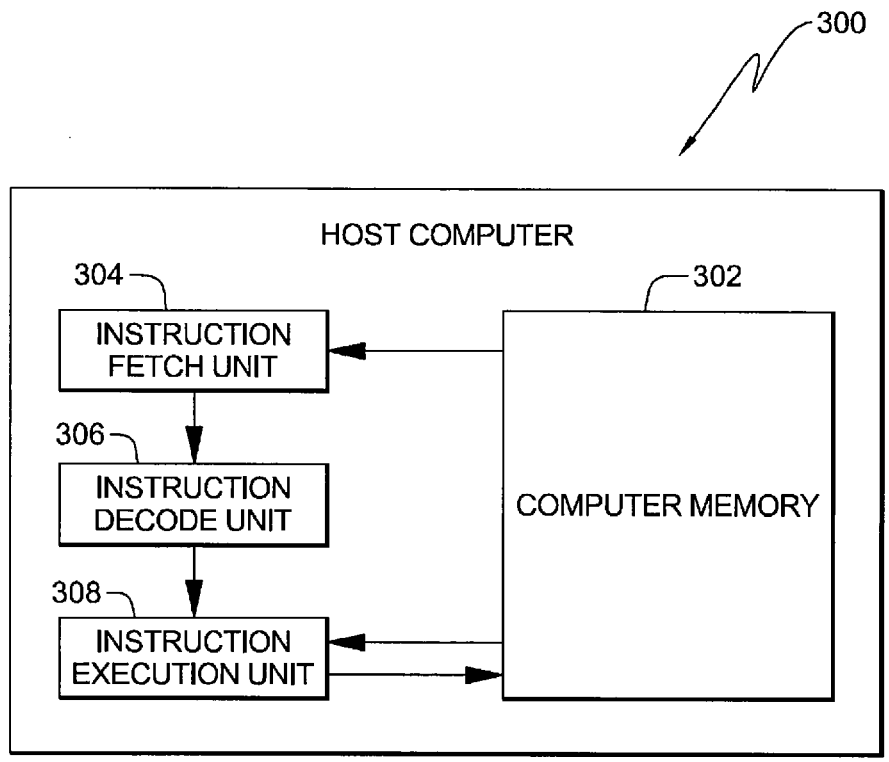
FIG. 3 depicts one embodiment of a host computer that can emulate another computer, in accordance with an aspect of the present invention.

Further, although FIG. 3 is described with reference to emulation, the environment of FIG. 3 need not be an emulation environment. In another example, instructions are executed in a native environment, and the operations are implemented in hardware, firmware, software or some combination thereof.

As described above, in one embodiment, each block of storage, such as each 4 k block of real or absolute storage, has associated therewith a storage key. The storage key provides a reliability mechanism that is used to segregate blocks of storage, ensuring that programs executing in one key do not accidentally store into blocks having a different key. Further, a storage key provides indications to an operating system as to which blocks have been referenced and changed, thus allowing the operating system to determine which blocks may need to be written to auxiliary storage.

Figure 4:
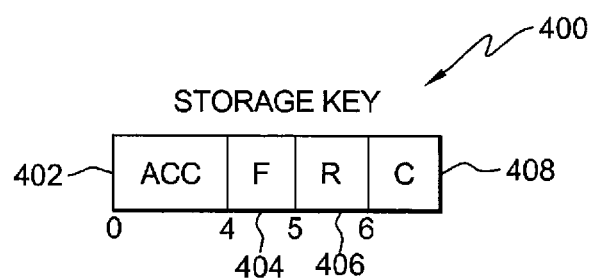
FIG. 4 depicts one example of the various components of a storage key, in accordance with an aspect of the present invention.

One example of a storage key is described with reference to FIG. 4. A storage key 400 includes for instance, an access control (ACC) component 402, a fetch protection (F) compo nent 404, a reference (R) component 406, and a change (C) component 408, each of which is described below:

Access control bits (ACC) 402 (e.g., bits 0-3): If a reference is subject to key-controlled protection, the access control bits are matched with an access key (e.g., of the program status word or from an instruction operand) when information is stored, or when information is fetched from a location that is protected against fetching.

Fetch-protection bit (F) 404 (e.g., bit 4): If a reference is subject to key-controlled protection, the fetch protection bit controls whether key-controlled protection applies to fetch-type references; a 0 indicates that only store-type references are monitored and that fetching with any access key is permitted; a 1 indicates that key-control protection applies to both fetching and storing. No distinction is made between the fetching of instructions and of operands.

Reference bit (R) 406 (e.g., bit 5): The reference bit normally is set to 1 each time a location in the corresponding storage block is referred to either for storing or for fetching of information.

Change bit (C) 408 (e.g., bit 6): The change bit is set to 1 each time information is stored at a location in the corresponding storage block.

Storage keys are not part of addressable storage. Thus, in one example, to set a storage key, instructions are used. One such instruction is a Set Storage Key Extended instruction, an embodiment of which is described in the IBM® publication entitled, "z/Architecture Principles of Operation," IBM Publication No. SA22-7832-07, February 2009, which is hereby incorporated herein by reference in its entirety. This instruction sets all components of the storage key, even if one or more of the components are being updated to the same value as before. Moreover, this instruction requires the system to be serialized to ensure that all CPUs observe the changes to the key. The serialization uses quiesce operations.

In a further embodiment, a conditional SSKE instruction may be used to set a storage key. This instruction allows the program to conditionally bypass the updating of, for instance, the reference component, the change component or both, when circumstances allow. That is, software (e.g., the operating system program) can indicate that either or both of these components do not need to be updated. This allows the CPU flexibility in implementation when the access key and fetch protection controls being set by the SSKE instruction match those currently in the key to be updated. This instruction selectively uses quiesce operations, depending on the fields being set. There are many cases, however, where the software needs to change the access control and fetch protection controls of the storage key, and therefore, conditional SSKE cannot be used.

Figure 5:
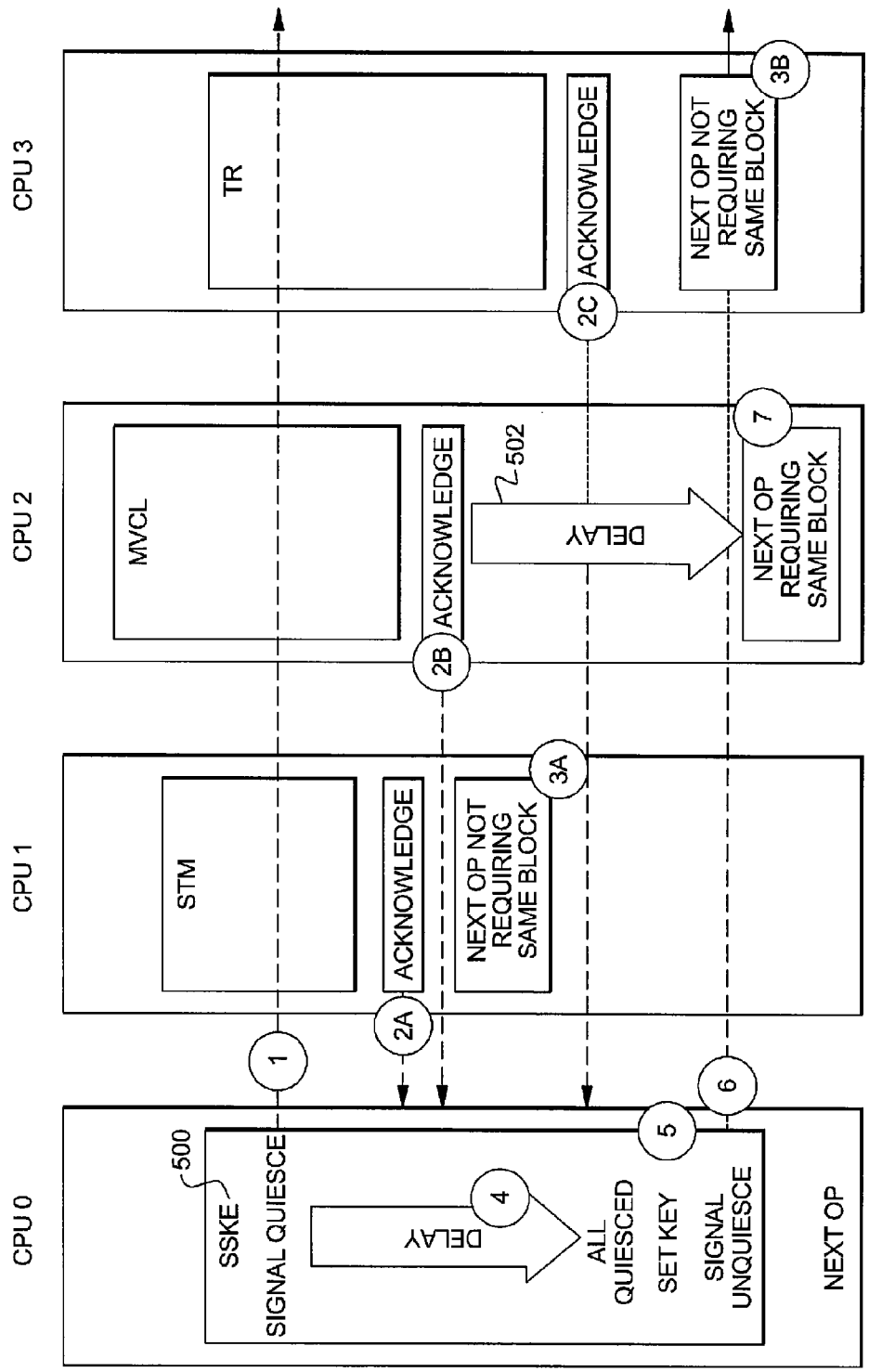
FIG. 5 pictorially depicts one example of the effect of a quiesce operation on a processor of the computing environment.

An overview of one example of processing associated with a Set Storage Key Extended instruction that uses a quiesce operation is described with reference to FIG. 5. As shown, in this particular example, there are four central processing units, CPU 0-CPU 3. CPU 0 is performing an SSKE operation (500). Thus, it initiates a quiesce operation at #1 to all the other central processing units. Upon completion of any current units of operation, the other CPUs in the configuration acknowledge receipt of the quiesce (e.g., #2a, #2b, #2c). Following the acknowledgment, each CPU purges any locally cached copies of the key. The CPUs, other than CPU 0, can continue executing operations that do not require access to the block being affected by the SSKE (#3a and #3b). However, if the CPU needs to access the same block in which the key is being set, the subsequent operation is delayed (502).

The execution of the SSKE instruction is delayed (#4) until all the CPUs have acknowledged receipt of the quiesce, at which point the storage key for the block can be set (#5). The CPU executing the SSKE then signals the other CPUs to unquiesce (#6). For CPU 2, which needs to access the same block in which the key is being set, the subsequent operation is delayed (#7) until unquiesce is signaled.

Figure 6:
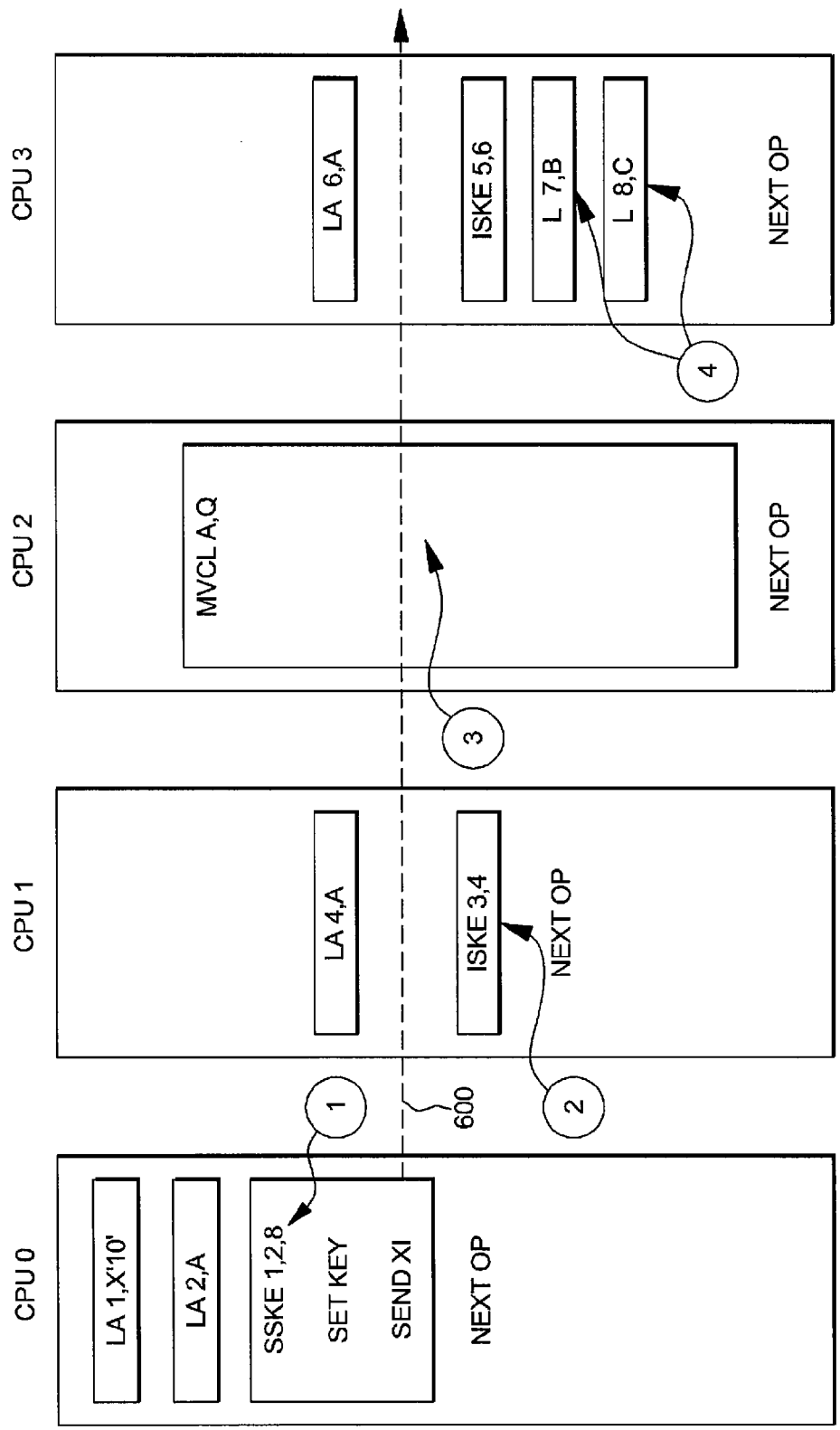
FIG. 6 pictorially depicts one example of the effect of manipulating a storage key without quiescing any of the processors, in accordance with an aspect of the present invention.

It is estimated that this quiescing operation causes a substantial delay in a large multiprocessor configuration. Thus, in accordance with an aspect of the present invention, a SSKE operation is provided that does not perform quiescing. This is illustrated in FIG. 6. In this illustration, the following conditions are assumed:

A, B, and C are ascending storage locations contained within a single 4K-byte block. The key for the block is originally anything except 1, in this example.

No quiesce is broadcast to the receiver CPUs, however, the initiator CPU does send cross-invalidate (XI) signals to the receiver CPUs to cause them to purge any cached copies of the key.

A new control (#1) of SSKE, described below, enables the non-quiescing operation. If the bit is zero, or if the $M_3$ operand is not coded, the original quiescing operation is performed.

The setting of the key follows the existing rules.

After CPU 0 sets the key and sends cross-invalidate signals to the other CPUs (600), CPU 1 may observe the new key in general register 3 (#2), and observe the change bit, as set by the MVCL (Move Character Long) that is concurrently executing in CPU 2.

All key checking for a unit of operation is performed at the start of the operation. Subsequent accesses for a unit of operation use the originally-observed key (#3). Assuming that the PSW key for CPU 2 initially matched the key of the block containing A, the MVCL continues to proceed even after CPU 0 changes the key.

Although CPU 3 may observe the new key in general register 5, the results fetched into general register 7 and 8 (#4) may contain old/old, old/new, new/old, or new/new data respectively, depending on the progress of the MVCL and the time the fetches were performed.

In accordance with an aspect of the present invention, it is determined at SSKE execution time whether that particular SSKE execution is to be quiescing or non-quiescing. This determination is made by an indicator set in the instruction and allows for compatibility with early configurations.

Figure 7A:
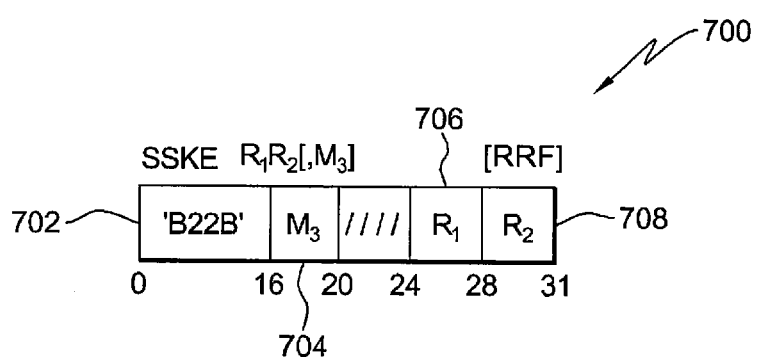
FIG. 7A depicts one embodiment of a format of a Set Storage Key Extended (SSKE) instruction used in accordance with an aspect of the present invention.

One embodiment of a format of a non-quiescing Set Storage Key Extended (SSKE) instruction 700 is described with reference to FIG. 7A. In this example, the instruction has an RRF format denoting a register-and-register operation, an extended opcode field, and an additional R field, M field, or both. Non-quiescing SSKE instruction 700 includes, for instance, an operation code 702 designating the Set Storage Key Extended instruction (e.g., 'B22B'); an $M_3$ operand 704 used by the program (e.g., operating system) to determine, for instance, if this SSKE operation is to be quiescing or non-quiescing; a register designation ($R_1$) 706 selecting a register that includes values to be set in the storage key; and a register designation ($R_2$) 708 selecting a register that includes the address of the storage key to be set.

Figure 7B:
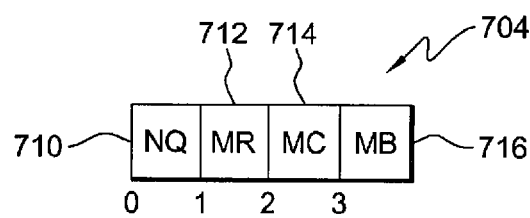
FIG. 7B depicts one embodiment of the fields associated with the $M_3$ operand of the SSKE instruction of FIG. 7A, in accordance with an aspect of the present invention.

Further details regarding the $M_3$ operand are described with reference to FIG. 7B. In one example, $M_3$ operand 704 includes a non-quiescing control (NQ) 710 (e.g., bit 0) that controls whether a quiescing operation is to be performed; a reference bit update mask (MR) 712 (e.g., bit 1) that controls whether updates to the reference bit in the storage key may be bypassed; a change bit update mask (MC) 714 (e.g., bit 2) that controls whether updates to the change bit in the storage key may be bypassed; and a multiple block control (MB) 716 (e.g., bit 3) that controls whether the storage keys for multiple 4 k-byte blocks of storage may be set.

Figure 8:
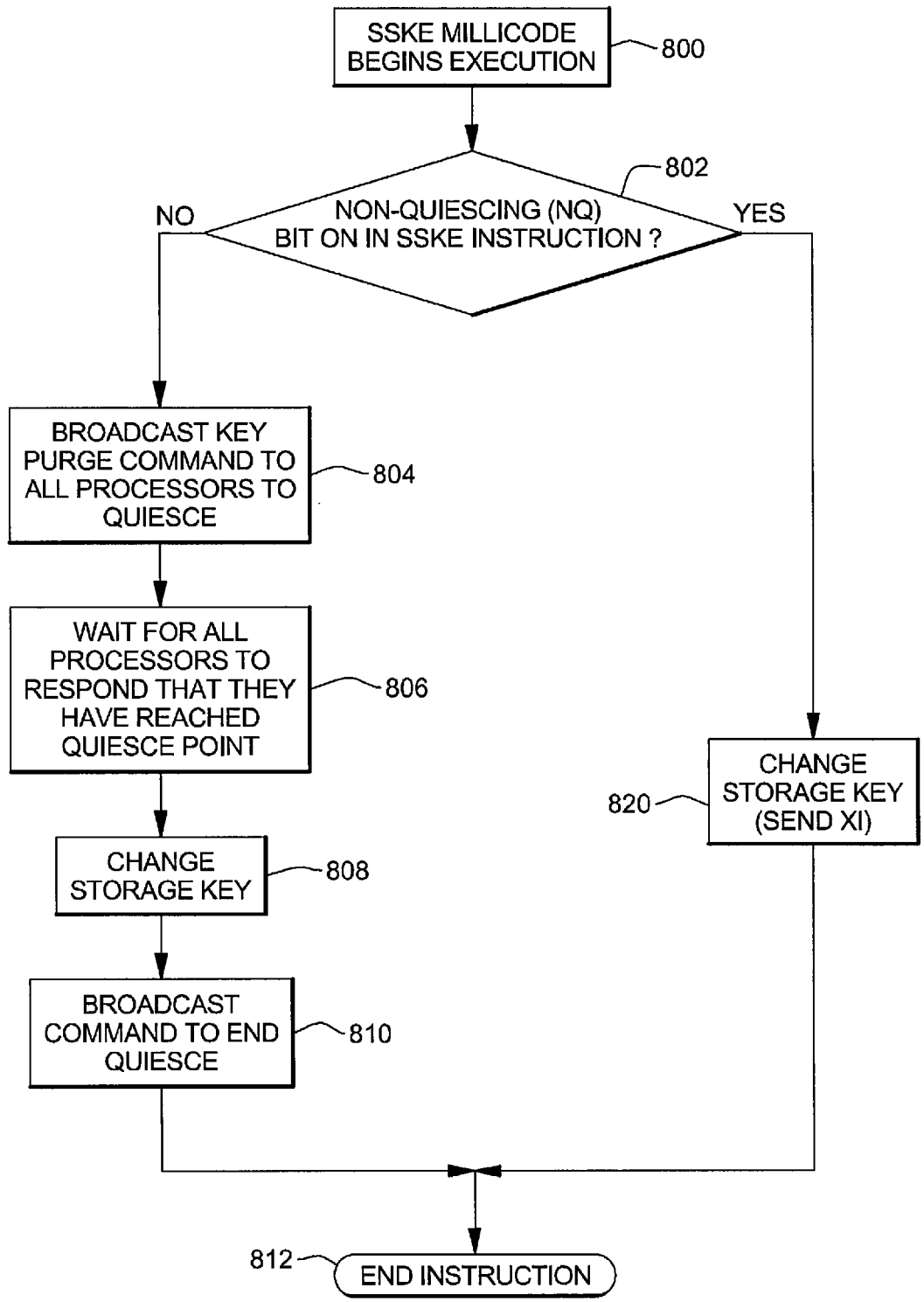
FIG. 8 depicts one embodiment of the logic associated with a non-quiescing SSKE instruction, in accordance with an aspect of the present invention.

In response to setting the non-quiescing control to one, for example, the quiescing operation of the SSKE instruction is not performed. This is described in further detail with reference to FIG. 8. Initially, SSKE Millicode (e.g., vertical microcode that executes on the processor) begins execution, STEP 800, and a determination is made as to whether the non-quiescing control is on in the SSKE instruction, INQUIRY 802. If the control is not on indicating that the quiescing operation of the SSKE instruction is to be performed, a key purge command is broadcast to all the processors of the system to quiesce processing, STEP 804.

Thereafter, the processor initiating the SSKE instruction waits for all the processors to which the purge command was sent to respond that they have reached their quiesce point, STEP 806. Responsive to receiving acknowledgments that all the processors have quiesced, the initiating processor changes the storage key, STEP 808. Further, it broadcasts a command to end the quiesce, allowing the processors to begin processing, again, STEP 810. Thereafter, instruction ends, STEP 812.

Returning to INQUIRY 802, if the non-quiescing control is on indicating that quiescing is to be bypassed, then the broadcast key purge command, the wait for the processors to quiesce, and the unquiesce are not performed. Instead, the storage key is simply changed, and in one embodiment, a cross-invalidation (XI) signal may be sent to the other CPUs to cause them to purge any locally cached copies of the key, STEP 820. The instruction ends, STEP 812. This bypassing of the quiesce operation is irrespective of the fields of the storage key to be changed. The only control for this bypassing is the value of the NQ field (and assuming non-quiesce is supported). There is no check of what fields of the storage key are to be changed and/or of their values in determining whether to bypass quiesce for the non-quiescing facility.

Further details regarding execution of a SSKE instruction, including a non-quiescing SSKE instruction of one aspect of the present invention, are now described. In this description, details regarding the conventional conditional SSKE facility are also described, as well as the conventional enhanced DAT facility for completeness of the SSKE instruction. Execution of a SSKE instruction results in the storage key for one or more 4K-byte blocks being replaced by the value in the first-operand register of the instruction.

In execution, when the conditional-SSKE facility is installed, certain functions of the key setting operation may be bypassed. When the conditional-SSKE facility is not installed, or when the conditional-SSKE facility is installed and both the MR and MC bits of the $M_3$ field are zero, the storage key for the 4K-byte block that is addressed by the contents of general register $R_2$ is replaced by bits from general register $R_1$. The instruction completes without changing the condition code.

When the conditional-SSKE facility is installed and either or both of the MR and MC bits are one, the access-control bits, fetch-protection bit, and, optionally, the reference bit and change bit of the storage key that is addressed by the contents of general register $R_2$ are compared with corresponding bits in general register $R_1$. If the compared bits are equal, then no change is made to the key; otherwise, selected bits of the key are replaced by the corresponding bits in general register $R_1$. The storage key prior to any modification is inserted in general register $R_1$, and the result is indicated by the condition code.

When the enhanced-DAT facility is installed, the above operations may be repeated for the storage keys of multiple 4K-byte blocks within the same 1 MB block, subject to the control of the multiple-block control of the $M_3$ field.

When the non-quiescing key setting facility is not installed, bit 0 of the $M_3$ field is ignored. When the conditional-SSKE facility is not installed, bit positions 1 and 2 of the $M_3$ field are ignored. When the enhanced-DAT facility is not installed, bit position 3 of the $M_3$ field is ignored.

When the conditional-SSKE facility is installed, processing is as follows:

1. When both the MR and MC bits, bits 1 and 2 of the $M_3$ field, are zero, the instruction completes as though the conditional-SSKE facility was not installed. The storage key for the 4K-byte block that is addressed by the contents of general register $R_2$ is replaced by bits from general register $R_1$, and the instruction completes without changing the condition code.
2. When either or both the MR and MC bits are one, processing is as follows:
    a. Prior to any modification, the contents of the storage key for the 4K-byte block that is addressed by general register $R_2$ are placed in bit positions 48-54 of general register $R_1$, and bit 55 of general register $R_1$ is set to zero. Bits 0-47 and 56-63 of the register remain unchanged.
       If an invalid checking-block code (CBC) is detected when fetching the storage key, then (a) the entire storage key for the 4K-byte block is replaced by bits 56-62 of general register $R_1$, (b) the contents of bit positions 48-55 of general register $R_1$ are unpredictable, and (c) the instruction completes by setting condition code 3.
    b. The access-control bits and fetch-protection bit of the storage key for the designated 4K-byte block are compared with the corresponding fields in bits 56-60 of general register $R_1$. If the respective fields are not equal, the entire storage key for the 4K-byte block is replaced by bits from general register $R_1$, and the instruction completes by setting condition code 1.
       When the access-control and fetch-protection bits in the storage key are equal to the respective bits in general register $R_1$, processing continues as described below.
    c. When both the MR and MC bits are one, the instruction completes by setting condition code 0. The storage key remains unchanged in this case.
    d. When the MR bit is zero and the MC bit is one, then the reference bit of the storage key for the designated 4K-byte block is compared with bit 61 of general register $R_1$. If the bits are equal, the instruction completes by setting condition code 0. The storage key remains unchanged in this case.
       If the bits are not equal, then either (a) the entire storage key for the designated 4K-byte block is replaced by the bits in general register $R_1$, and the instruction completes by setting condition code 1; or (b) the reference bit for the storage key is replaced by bit 61 of general register $R_1$, the change bit for the key is unpredictable, and the instruction completes by setting condition code 2. It is unpredictable whether condition code 1 or 2 is set.
    e. When the MC bit is zero and the MR bit is one, then the change bit of the storage key for the designated 4K-byte block is compared with bit 62 of general register $R_1$. If the bits are equal, the instruction completes by setting condition code 0. The storage key remains unchanged in this case, except that the reference bit is unpredictable.

If the bits are not equal, then either (a) the entire storage key for the designated 4K-byte block is replaced by the bits in general register $R_1$, and the instruction completes by setting condition code 1; or (b) the change bit for the storage key is replaced by bit 62 of general register $R_1$, the reference bit for the key is unpredictable, and the instruction completes by setting condition code 2. It is unpredictable whether condition code 1 or 2 is set.

When the enhanced-DAT facility is not installed, or when the facility is installed but the multiple-block control is zero, general register $R_2$ contains a real address. When the enhanced-DAT facility is installed and the multiple-block control is one, general register $R_2$ contains an absolute address.

In the 24-bit addressing mode, bits 40-51 of general register $R_2$ designate a 4K-byte block in real or absolute storage, and bits 0-39 and 52-63 of the register are ignored. In the 31-bit addressing mode, bits 33-51 of general register $R_2$ designate a 4K-byte block in real or absolute storage, and bits 0-32 and 52-63 of the register are ignored. In the 64-bit addressing mode, bits 0-51 of general register $R_2$ designate a 4K-byte block in real or absolute storage, and bits 52-63 of the register are ignored.

Because it is a real or absolute address, the address designating the storage block is not subject to dynamic address translation. The reference to the storage key is not subject to a protection exception.

The new seven-bit storage-key value, or selected bits thereof, is obtained from bit positions 56-62 of general register $R_1$. The contents of bit positions 0-55 and 63 of the register are ignored. When the conditional-SSKE facility is installed, and either or both the MR and MC bits are one, bit position 63 should contain a zero; otherwise, the program may not operate compatibly in the future.

A serialization and checkpoint-synchronization function is performed before the operation begins and again after the operation is completed, except that when the conditional-SSKE facility is installed and the resulting condition code is 0, it is unpredictable whether a serialization and checkpoint-synchronization function is performed after the operation completes.

When the non-quiescing key setting facility is not installed, or when the facility is installed and the non-quiescing control (NQ) is zero, the following applies:

A quiescing operation is performed.

For any store access, by a CPU or channel program, completed to the designated 4K-byte block either before or after the setting of the key by this instruction, the associated setting of the reference and change bits to one in the storage key for the block also is completed before or after, respectively, the execution of this instruction.

When the non-quiescing key setting facility is installed and the NQ control is one, a quiescing operation is not performed.

References to the storage key for a non-quiescing key setting operation (and other operations) are handled as follows:

1. Whenever a reference to storage is made and key-controlled protection applies to the reference, the four access-control bits and the fetch-protection bit associated with the storage location are inspected concurrently. The inspection of the access-control and fetch-protection bits occurs concurrently with the reference to the storage location, except when a non-quiescing key setting operation is performed for a storage location by one CPU, the following applies:

The inspection of the access-control and fetch-protection bits for the storage location by any CPU may precede a store reference to the location. In the case where the inspection of the access-control and fetch-protection bits precedes the store, the inspection occurs no earlier than after the last serialization operation on the CPU, and no earlier than the last quiescing key setting operation for the same storage location on any CPU.

When a unit of operation or instruction execution on any other CPU causes multiple accesses to the same 4K-byte block as that of the key setting operation, the other CPU inspects the access-control and fetch-protection bits only for the first reference to the block. The other CPU does not necessarily inspect the access-control and fetch-protection bits for the subsequent accesses within the block by the same unit of operation.

2. When storing is performed by a CPU, the change bit is set to one in the associated storage key concurrently with the completion of the store access, as observed by the CPU itself. When storing is performed by a CPU or a channel program, the change bit is set to one in the associated storage key either before or after the completion of the store access, as observed by other (if the store was performed by a CPU) or all (if the store was performed by a channel program) CPUs. As observed by other or all CPUs, the change bit is set no earlier than (1) after the last serialization function performed previously by the CPU channel program performing the store, and (2) after the execution, by any CPU in the configuration, of a quiescing key setting instruction that last set the associated storage key before the completion of the store. As observed by other or all CPUs, a change-bit setting necessarily occurs only when any of the following occurs subsequent to the storing operation:

The CPU or channel program that performed the store performs a serialization function.

The store was performed by a CPU or a channel program, and any CPU in the configuration sets the subject change bit by executing a key setting instruction after the store access is completed. The change-bit setting due to the store access occurs before the setting by the key setting instruction, except that when the non-quiescing key setting facility is installed, the change bit may appear to be set following a non-quiescing key setting instruction.

The store was performed by a CPU and is or will be completed, and any CPU in the configuration executes a COMPARE AND SWAP AND PURGE, INVALIDATE DAT TABLE ENTRY, or INVALIDATE PAGE TABLE ENTRY instruction that clears from the ALB (ART-Lookaside Buffer) or TLB of the storing CPU any entry used to complete the store. Completion of the clearing instruction is delayed until the subject store and change-bit setting have been completed.

The store was performed by a CPU, and that CPU examines the subject change bit by means of an INSERT STORAGE KEY EXTENDED or RESET REFERENCE BIT EXTENDED instruction.

When using a key setting instruction with the non-quiescing control set to one, the program may ensure, in one example, that no other CPUs or channel programs are referencing the storage for which keys are being set. For example, in a virtual storage environment, access to a storage location may be restricted by simply not mapping it to any virtual address space.

The following example illustrates the observation of changed data following a non-quiescing key setting operation. The initial conditions of the example are as follows:

Storage location A is a 256-byte area contained entirely within a single 4K-byte block. The access control bits in the storage key for this block are 0001 binary. B and C are ascending locations within area A.

The PSW key for CPU 1 is 1.

CPU 1 determines that A is accessible before the non-quiescing SSKE on CPU 2 changes the access-control of the storage key for A to 2.

| CPU 1 (PSW Key = 1) | CPU 2 | |
|---|---|---|
| . | LA | 1,X'20' |
| . | | |
| MVC A, X | LA | 2,A |
| . | SSKE | 1,2,8 |
| . | | |
| . | L | 3,B |
| . | | |
| . | L | 4,C |
| . | | |

With a quiescing SSKE, general registers 3 and 4 will both contain the new data if the MVC (Move Character) executes before the SSKE, or the registers will both contain the old data if the SSKE executes first (and the MVC results in a key-controlled protection exception).

However, in this scenario using a non-quiescing SSKE, the values loaded (L) into general registers 3/4 may contain old/old, old/new, new/old, or new/new data, depending on the timing of the fetches by CPU 2. Once CPU 1 has determined that block A is accessible for the MVC, the MVC can continue to completion without a key-controlled protection exception being recognized—even though CPU 2 changes the key of the block, while the MVC on CPU 1 continues to make subsequent accesses.

The following example illustrates the potential over-indication of the change bit when a non-quiescing key setting operation is performed. In this example, the initial PSW key for CPU 1 and the initial access-control bits in the storage key for location BLOCK are both 1. CPU 2 executes a non-quiescing SSKE to set the access-control bits of the storage key for BLOCK to 2.

| CPU 1 | | CPU 2 | |
|---|---|---|---|
| LA | 2,BLOCK | LA | 1,X'20' |
| ST | 0,0(,2) | LA | 2,BLOCK |
| . | | SSKE | 1,2,8 |
| . | | | |
| ISKE | 1,2 | | |

In this scenario, the results of the ISKE (Insert Storage Key Extended) on CPU 1 indicate the new access-control value (2) in bits 56-59 of general register 1, but the change bit in bit 62 of the register may be one. This over indication of the change bit—a result of the late setting of the bit by the store on CPU 1—may result in the unnecessary paging of the storage frame containing BLOCK.

On certain models, multiple copies of a storage key for an individual 4K-byte block may be observable following a non-quiescing key setting operation. As an example, the access-control and fetch-protection bits for a block may be distributed among the cache directory entries for any cached lines of the block. The following example illustrates how differing values of a storage key for the same 4K-byte block might be observable. The initial conditions of the example are as follows:

Storage location A is within a 4K-byte block.

The access-control bits in the storage key for the block are 0001 binary, and the fetch-protection bit is 1.

Storage location B is within the same block as A, but in a different cache line.

The PSW key for CPU 2 is 2.

| CPU 1 | | CPU 2 (PSW Key = 2) | |
|---|---|---|---|
| LA | 1,X'28' | . | |
| . | | . | |
| LA | 2,A | . | |
| . | | . | |
| SSKE | 1,2,8 | L | 3,A |
| . | | L | 4,B |
| . | | . | |

In this scenario, the fetch from location B on CPU 2 may result in a protection exception even though the fetch from location A was successful. This is because the key in the cache-directory entry for A has been updated with the new key, whereas the cache-directory entry for B has not yet been updated. One example of handling this potential protection exception is described below.

The following scenario provides another illustration of how multiple copies of a key may be observable when using the non-quiescing key setting option. The initial conditions of the example are as follows:

Storage locations A and B are two separate 4 K-bye blocks.

For both A and B, the access-control and fetch-protection bits are initially 0001 and 1 binary, respectively.

The PSW keys for CPUs 3 and 4 are both 2.

| CPU 1 | | CPU 2 | | CPU 3 | | CPU 4 | |
|---|---|---|---|---|---|---|---|
| LA | 1,X'28' | LA | 3,X'28' | . | | . | |
| . | | . | | . | | . | |
| LA | 2,A | LA | 4,B | . | | . | |
| . | | . | | . | | . | |
| SSKE | 1,2,8 | SSKE | 3,4,8 | L | 5,A | L | 7,B |
| . | | . | | L | 6,B | L | 8,A |
| . | | . | | | | | |

It is possible for CPU 3's fetch from location A to be successful (indicating that the results of the SSKE on CPU 1 have been observed), while CPU 3's fetch from location B is not successful (indicating that the results of the SSKE on CPU 2 have not yet been observed). Furthermore, it is also possible for CPU 4's fetch from locations A and B to both be successful. If CPU 4's fetch from location B is successful, the fetch from location A is not to encounter a key-controlled protection exception.

As described above, in accordance with an aspect of the present invention, when a non-quiescing key setting instruction (such as SSKE) is executed on a processor, it does not forward a quiesce request to the other CPUs of the system. It simply changes the storage key (and may forward a cross-invalidate signal). Other CPUs may see that change immediately or at some point in the future. Responsive to this processing, another processor could receive a delayed access exception machine check (DAE). This is generally fatal to software and is to be avoided. A DAE occurs, for example, when access to a storage location is permitted when an instruction's execution begins, but becomes prohibited later in its execution. For a hardware-executed instruction, this is not an issue because such an instruction can usually be nullified anytime during its execution. However, when Millicode (or other software) is executing the instruction, nullification typically becomes impossible after an architected facility (e.g., storage or a register) has been modified. Thus, in accordance with an aspect of the present invention, each processor includes a capability to handle this situation. One example of this capability is described with reference to FIGS. 9A-9B.

Figure 9A:
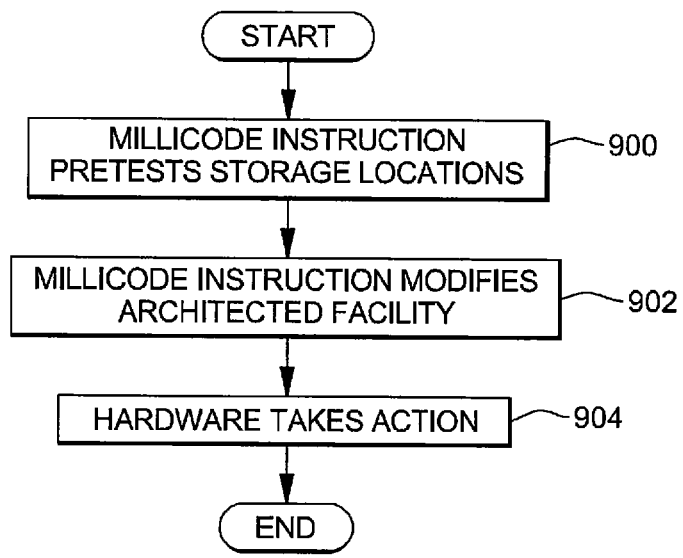
FIGS. 9A-9B depict one embodiment of the logic to manage processing affected by a non-quiesce update to the storage key, in accordance with an aspect of the present invention.

Referring to FIG. 9A, when a Millicode instruction (such as an instruction which makes multiple accesses to storage (e.g., a move character long (MVCL) instruction)) begins executing, it pretests the storage locations that will be accessed by the instruction to determine accessibility, STEP 900. In one example, this includes testing the first byte to be accessed and the last byte. If those tests are successful, then the pretesting is successful.

If there is a problem during pretest, then the instruction ends with a protection exception. However, if the pretest is successful, then the instruction can continue, since it has permission (at least implicitly, if not explicitly) to access those storage locations.

During execution, the instruction modifies a location in storage or a register, STEP 902. In response to Millicode modifying the first architected facility, hardware automatically takes action, STEP 904. This processing is described with reference to FIG. 9B.

Responsive to Millicode modifying the first architected facility, STEP 920, hardware automatically sets an indicator, STEP 922, to indicate that it is in a state of having already pretested the storage locations and having updated the first architected facility. This indicator is, for instance, flag 223 in interrupt controls 220 (FIG. 2).

Figure 9B:
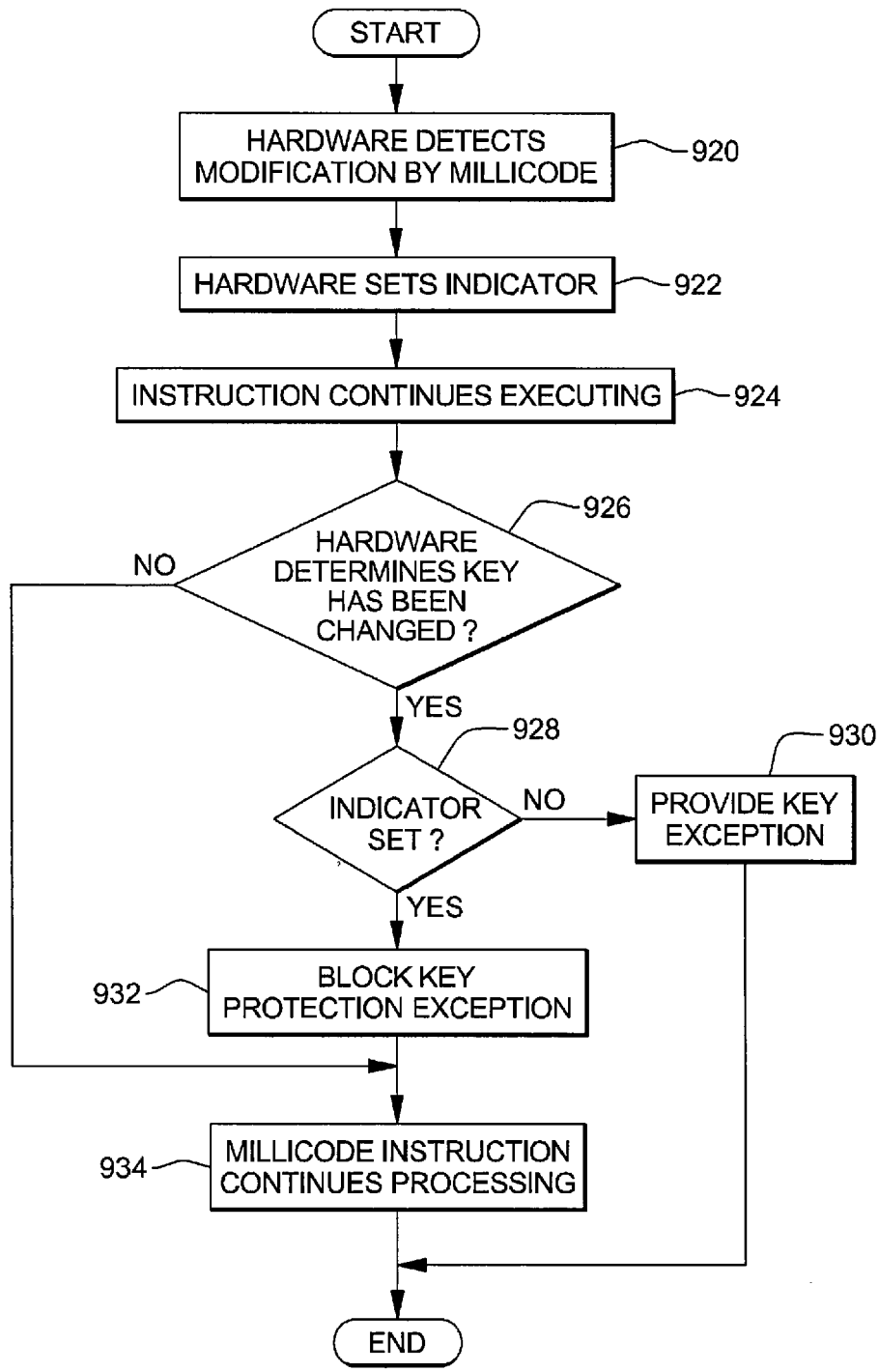

Continuing with reference to FIG. 9B, the instruction continues executing, STEP 924, and responsive to the hardware setting the indicator, if a key protection exception is to be presented, the hardware, in that instruction's execution, automatically blocks the key protection exception. A key protection exception could manifest itself if another processor did change a storage key via a non-quiescing SSKE, while this processor was accessing that storage within the Millicode routine.

Should the hardware determine that the storage key was changed while this Millicode instruction was accessing the storage protected by that storage key, INQUIRY 926, the hardware determines if the indicator is set, INQUIRY 928. If the indicator is not set, then a key protection exception is provided, STEP 930, and the Millicode instruction completes unsuccessfully.

However, if the indicator is set, INQUIRY 928, then the key protection exception is blocked, STEP 932. For example, interrupt controls 220 determines that the flag is set and sends an indication to execution controls 222 to block the key protection exception. This enables the Millicode instruction to continue processing, STEP 934, even though it observes a changed storage key.

Described in detail above is a non-quiescing key setting facility, in which storage keys are set without requiring a quiesce operation irrespective of the fields of the storage key or the values of those fields being set. Since this is a non-quiescing operation, if it is determined that a storage key has changed for a storage location in which an instruction was granted access, then a mechanism is provided to block a key protection exception. It is then up to the operating system executing that instruction to handle the potential data integrity concern.

Although the above examples are described with reference to a SSKE instruction, similar logic applies to other instructions that update the storage key, such as the PFMF instruction or other instructions. Further, although storage keys are being updated herein, in other examples, other type of property or resources used to protect storage may also make use of one or more aspects of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Figure 10:
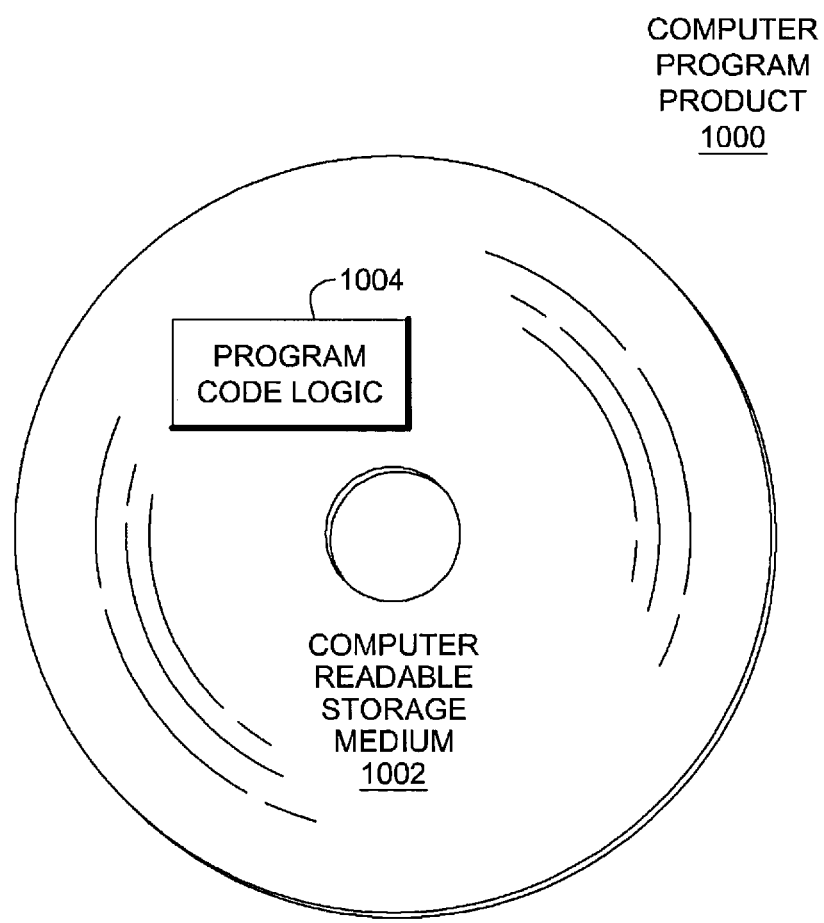
FIG. 10 depicts one embodiment of a computer program product incorporating one or more aspects of the present invention.

Referring now to FIG. 10, in one example, a computer program product 1000 includes, for instance, one or more computer readable storage media 1002 to store computer readable program code means or logic 1004 thereon to provide and facilitate one or more aspects of the present invention.

Program code embodied on a computer readable medium may be transmitted using an appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language, such as Java, Smalltalk, C++ or the like, and conventional procedural programming languages, such as the "C" and assembler programming languages or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In addition to the above, one or more aspects of the present invention may be provided, offered, deployed, managed, serviced, etc. by a service provider who offers management of customer environments. For instance, the service provider can create, maintain, support, etc. computer code and/or a computer infrastructure that performs one or more aspects of the present invention for one or more customers. In return, the service provider may receive payment from the customer under a subscription and/or fee agreement, as examples. Additionally or alternatively, the service provider may receive payment from the sale of advertising content to one or more third parties.

In one aspect of the present invention, an application may be deployed for performing one or more aspects of the present invention. As one example, the deploying of an application comprises providing computer infrastructure operable to perform one or more aspects of the present invention.

As a further aspect of the present invention, a computing infrastructure may be deployed comprising integrating computer readable code into a computing system, in which the code in combination with the computing system is capable of performing one or more aspects of the present invention.

As yet a further aspect of the present invention, a process for integrating computing infrastructure comprising integrating computer readable code into a computer system may be provided. The computer system comprises a computer readable medium, in which the computer medium comprises one or more aspects of the present invention. The code in combination with the computer system is capable of performing one or more aspects of the present invention.

Although various embodiments are described above, these are only examples. For example, computing environments of other architectures can incorporate and use one or more aspects of the present invention. Additionally, other instructions or operations may benefit from one or more aspects of the present invention. Moreover, other formats of the instructions may be used and/or additional, fewer or different fields may be included. Many variations are possible.

Further, other types of computing environments can benefit from one or more aspects of the present invention. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

Figure 11:
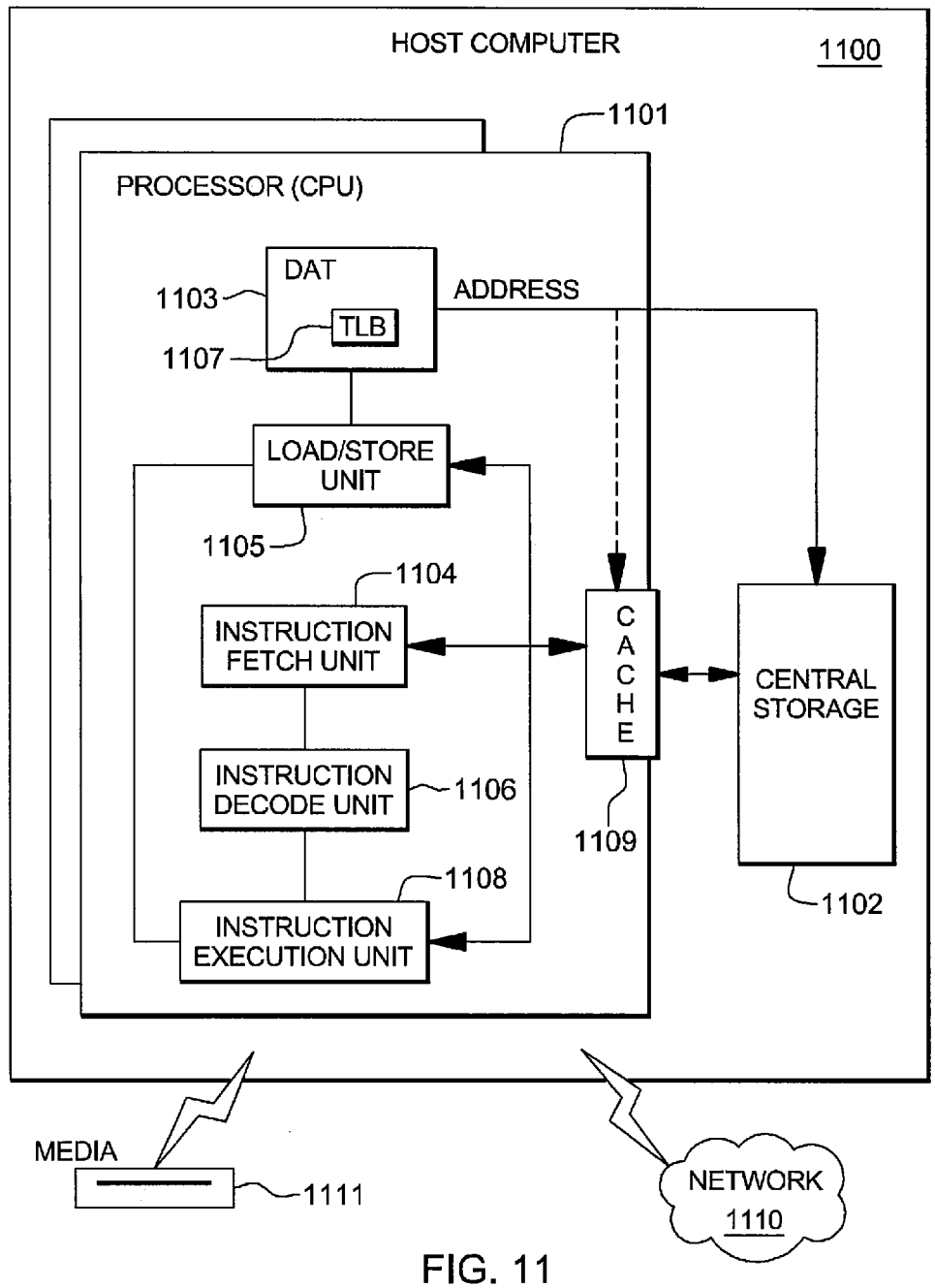
FIG. 11 depicts one embodiment of a host computer system to incorporate and use one or more aspects of the present invention.

Referring to FIG. 11, representative components of a Host Computer system 1100 to implement one or more aspects of the present invention are portrayed. The representative host computer 1100 comprises one or more CPUs 1101 in communication with computer memory (i.e., central storage) 1102, as well as I/O interfaces to storage media devices 1111 and networks 1110 for communicating with other computers or SANs and the like. The CPU 1101 is compliant with an architecture having an architected instruction set and architected functionality. The CPU 1101 may have dynamic address translation (DAT) 1103 for transforming program addresses (virtual addresses) into real addresses of memory. A DAT typically includes a translation lookaside buffer (TLB) 1107 for caching translations so that later accesses to the block of computer memory 1102 do not require the delay of address translation. Typically, a cache 1109 is employed between computer memory 1102 and the processor 1101. The cache 1109 may be hierarchical having a large cache available to more than one CPU and smaller, faster (lower level) caches between the large cache and each CPU. In some implementations, the lower level caches are split to provide separate low level caches for instruction fetching and data accesses. In one embodiment, an instruction is fetched from memory 1102 by an instruction fetch unit 1104 via a cache 1109. The instruction is decoded in an instruction decode unit 1106 and dispatched (with other instructions in some embodiments) to instruction execution unit or units 1108. Typically several execution units 1108 are employed, for example an arithmetic execution unit, a floating point execution unit and a branch instruction execution unit. The instruction is executed by the execution unit, accessing operands from instruction specified registers or memory as needed. If an operand is to be accessed (loaded or stored) from memory 1102, a load/store unit 1105 typically handles the access under control of the instruction being executed. Instructions may be executed in hardware circuits or in internal microcode (firmware) or by a combination of both.

As noted, a computer system includes information in local (or main) storage, as well as addressing, protection, and reference and change recording. Some aspects of addressing include the format of addresses, the concept of address spaces, the various types of addresses, and the manner in which one type of address is translated to another type of address. Some of main storage includes permanently assigned storage locations. Main storage provides the system with directly addressable fast-access storage of data. Both data and programs are to be loaded into main storage (from input devices) before they can be processed.

Main storage may include one or more smaller, faster-access buffer storages, sometimes called caches. A cache is typically physically associated with a CPU or an I/O processor. The effects, except on performance, of the physical construction and use of distinct storage media are generally not observable by the program.

Separate caches may be maintained for instructions and for data operands. Information within a cache is maintained in contiguous bytes on an integral boundary called a cache block or cache line (or line, for short). A model may provide an EXTRACT CACHE ATTRIBUTE instruction which returns the size of a cache line in bytes. A model may also provide PREFETCH DATA and PREFETCH DATA RELATIVE LONG instructions which effects the prefetching of storage into the data or instruction cache or the releasing of data from the cache.

Storage is viewed as a long horizontal string of bits. For most operations, accesses to storage proceed in a left-to-right sequence. The string of bits is subdivided into units of eight bits. An eight-bit unit is called a byte, which is the basic building block of all information formats. Each byte location in storage is identified by a unique nonnegative integer, which is the address of that byte location or, simply, the byte address. Adjacent byte locations have consecutive addresses, starting with 0 on the left and proceeding in a left-to-right sequence. Addresses are unsigned binary integers and are 24, 31, or 64 bits.

Information is transmitted between storage and a CPU or a channel subsystem one byte, or a group of bytes, at a time. Unless otherwise specified, a group of bytes in storage is addressed by the leftmost byte of the group. The number of bytes in the group is either implied or explicitly specified by the operation to be performed. When used in a CPU operation, a group of bytes is called a field. Within each group of bytes, bits are numbered in a left-to-right sequence. The leftmost bits are sometimes referred to as the "high-order" bits and the rightmost bits as the "low-order" bits. Bit numbers are not storage addresses, however. Only bytes can be addressed. To operate on individual bits of a byte in storage, the entire byte is accessed. The bits in a byte are numbered 0 through 7, from left to right. The bits in an address may be numbered 8-31 or 40-63 for 24-bit addresses or 1-31 or 33-63 for 31-bit addresses; they are numbered 0-63 for 64-bit addresses. Within any other fixed-length format of multiple bytes, the bits making up the format are consecutively numbered starting from 0. For purposes of error detection, and in preferably for correction, one or more check bits may be transmitted with each byte or with a group of bytes. Such check bits are generated automatically by the machine and cannot be directly controlled by the program. Storage capacities are expressed in number of bytes. When the length of a storage-operand field is implied by the operation code of an instruction, the field is said to have a fixed length, which can be one, two, four, eight, or sixteen bytes. Larger fields may be implied for some instructions. When the length of a storage-operand field is not implied but is stated explicitly, the field is said to have a variable length. Variable-length operands can vary in length by increments of one byte (or with some instructions, in multiples of two bytes or other multiples). When information is placed in storage, the contents of only those byte locations are replaced that are included in the designated field, even though the width of the physical path to storage may be greater than the length of the field being stored.

Certain units of information are to be on an integral boundary in storage. A boundary is called integral for a unit of information when its storage address is a multiple of the length of the unit in bytes. Special names are given to fields of 2, 4, 8, and 16 bytes on an integral boundary. A halfword is a group of two consecutive bytes on a two-byte boundary and is the basic building block of instructions. A word is a group of four consecutive bytes on a four-byte boundary. A doubleword is a group of eight consecutive bytes on an eight-byte boundary. A quadword is a group of 16 consecutive bytes on a 16-byte boundary. When storage addresses designate halfwords, words, doublewords, and quadwords, the binary representation of the address contains one, two, three, or four rightmost zero bits, respectively. Instructions are to be on two-byte integral boundaries. The storage operands of most instructions do not have boundary-alignment requirements.

On devices that implement separate caches for instructions and data operands, a significant delay may be experienced if the program stores into a cache line from which instructions are subsequently fetched, regardless of whether the store alters the instructions that are subsequently fetched.

In one embodiment, the invention may be practiced by software (sometimes referred to licensed internal code, firmware, micro-code, milli-code, pico-code and the like, any of which would be consistent with the present invention). Referring to FIG. 11, software program code which embodies the present invention is typically accessed by processor 1101 of the host system 1100 from long-term storage media devices 1111, such as a CD-ROM drive, tape drive or hard drive. The software program code may be embodied on any of a variety of known media for use with a data processing system, such as a diskette, hard drive, or CD-ROM. The code may be distributed on such media, or may be distributed to users from computer memory 1102 or storage of one computer system over a network 1110 to other computer systems for use by users of such other systems.

The software program code includes an operating system which controls the function and interaction of the various computer components and one or more application programs. Program code is normally paged from storage media device 1111 to the relatively higher-speed computer storage 1102 where it is available for processing by processor 1101. The techniques and methods for embodying software program code in memory, on physical media, and/or distributing software code via networks are well known and will not be further discussed herein. Program code, when created and stored on a tangible medium (including but not limited to electronic memory modules (RAM), flash memory, Compact Discs (CDs), DVDs, Magnetic Tape and the like is often referred to as a "computer program product". The computer program product medium is typically readable by a processing circuit preferably in a computer system for execution by the processing circuit.

Figure 12:
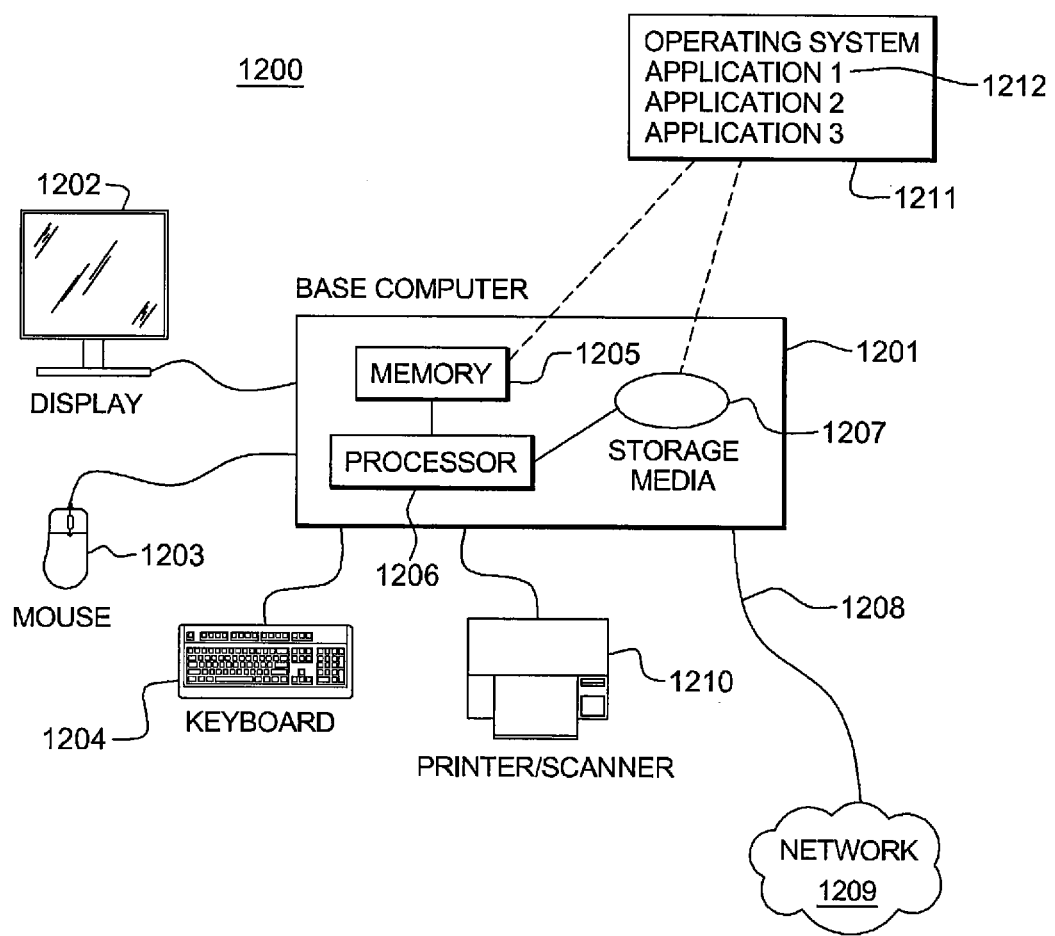
FIG. 12 depicts a further example of a computer system to incorporate and use one or more aspects of the present invention.

FIG. 12 illustrates a representative workstation or server hardware system in which the present invention may be practiced. The system 1200 of FIG. 12 comprises a representative base computer system 1201, such as a personal computer, a workstation or a server, including optional peripheral devices. The base computer system 1201 includes one or more processors 1206 and a bus employed to connect and enable communication between the processor(s) 1206 and the other components of the system 1201 in accordance with known techniques. The bus connects the processor 1206 to memory 1205 and long-term storage 1207 which can include a hard drive (including any of magnetic media, CD, DVD and Flash Memory for example) or a tape drive for example. The system 1201 might also include a user interface adapter, which connects the microprocessor 1206 via the bus to one or more interface devices, such as a keyboard 1204, a mouse 1203, a printer/scanner 1210 and/or other interface devices, which can be any user interface device, such as a touch sensitive screen, digitized entry pad, etc. The bus also connects a display device 1202, such as an LCD screen or monitor, to the microprocessor 1206 via a display adapter.

The system 1201 may communicate with other computers or networks of computers by way of a network adapter capable of communicating 1208 with a network 1209. Example network adapters are communications channels, token ring, Ethernet or modems. Alternatively, the system 1201 may communicate using a wireless interface, such as a CDPD (cellular digital packet data) card. The system 1201 may be associated with such other computers in a Local Area Network (LAN) or a Wide Area Network (WAN), or the system 1201 can be a client in a client/server arrangement with another computer, etc. All of these configurations, as well as the appropriate communications hardware and software, are known in the art.

Figure 13:
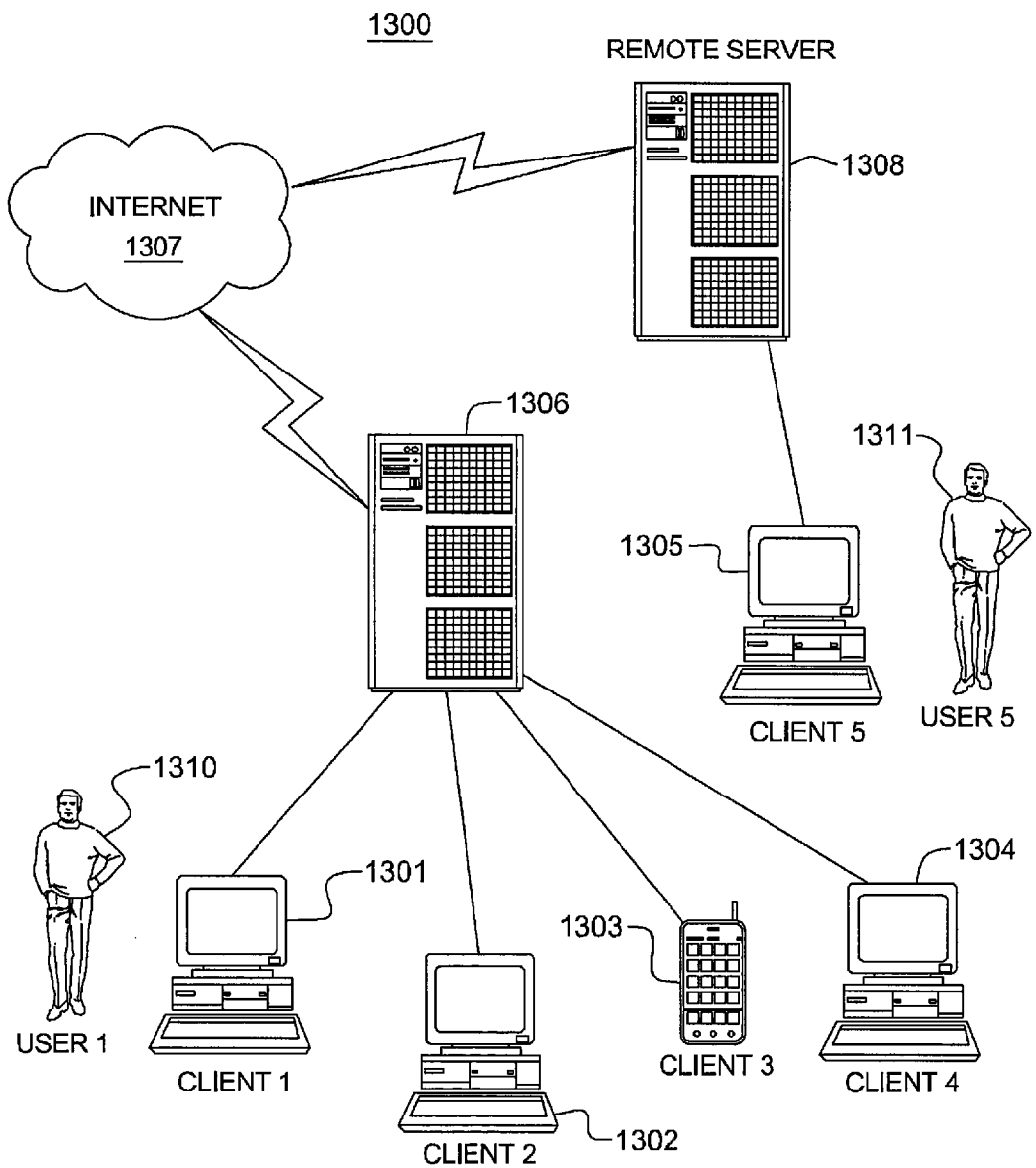
FIG. 13 depicts another example of a computer system comprising a computer network to incorporate and use one or more aspects of the present invention.

FIG. 13 illustrates a data processing network 1300 in which the present invention may be practiced. The data processing network 1300 may include a plurality of individual networks, such as a wireless network and a wired network, each of which may include a plurality of individual workstations 1301, 1302, 1303, 1304. Additionally, as those skilled in the art will appreciate, one or more LANs may be included, where a LAN may comprise a plurality of intelligent workstations coupled to a host processor.

Still referring to FIG. 13, the networks may also include mainframe computers or servers, such as a gateway computer (client server 1306) or application server (remote server 1308 which may access a data repository and may also be accessed directly from a workstation 1305). A gateway computer 1306 serves as a point of entry into each individual network. A gateway is needed when connecting one networking protocol to another. The gateway 1306 may be preferably coupled to another network (the Internet 1307 for example) by means of a communications link. The gateway 1306 may also be directly coupled to one or more workstations 1301, 1302, 1303, 1304 using a communications link. The gateway computer may be implemented utilizing an IBM eServer™ zSeries® z9® Server available from International Business Machines Corporation.

Referring concurrently to FIG. 12 and FIG. 13, software programming code which may embody the present invention may be accessed by the processor 1206 of the system 1201 from long-term storage media 1207, such as a CD-ROM drive or hard drive. The software programming code may be embodied on any of a variety of known media for use with a data processing system, such as a diskette, hard drive, or CD-ROM. The code may be distributed on such media, or may be distributed to users 1310, 1311 from the memory or storage of one computer system over a network to other computer systems for use by users of such other systems.

Alternatively, the programming code may be embodied in the memory 1205, and accessed by the processor 1206 using the processor bus. Such programming code includes an operating system which controls the function and interaction of the various computer components and one or more application programs 1212. Program code is normally paged from storage media 1207 to high-speed memory 1205 where it is available for processing by the processor 1206. The techniques and methods for embodying software programming code in memory, on physical media, and/or distributing software code via networks are well known and will not be further discussed herein. Program code, when created and stored on a tangible medium (including but not limited to electronic memory modules (RAM), flash memory, Compact Discs (CDs), DVDs, Magnetic Tape and the like is often referred to as a "computer program product". The computer program product medium is typically readable by a processing circuit preferably in a computer system for execution by the processing circuit.

The cache that is most readily available to the processor (normally faster and smaller than other caches of the processor) is the lowest (L1 or level one) cache and main store (main memory) is the highest level cache (L3 if there are 3 levels). The lowest level cache is often divided into an instruction cache (I-Cache) holding machine instructions to be executed and a data cache (D-Cache) holding data operands.

Figure 14:
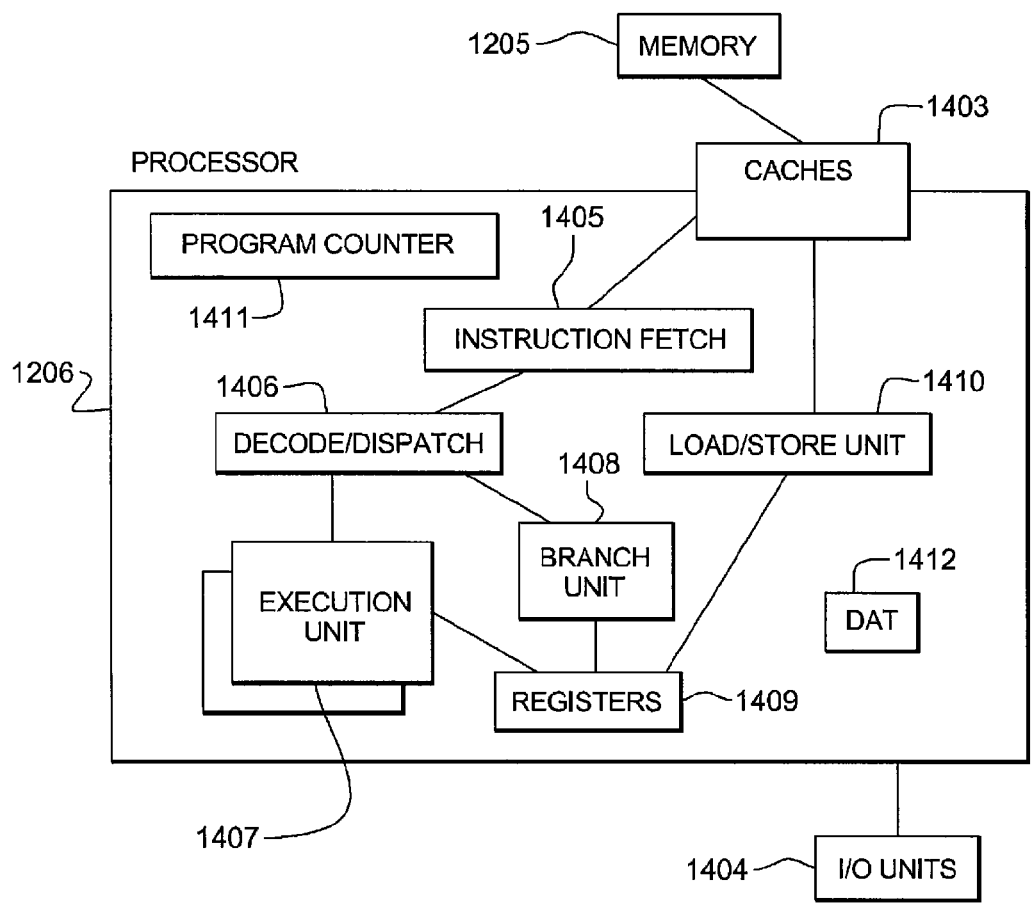
FIG. 14 depicts one embodiment of various elements of a computer system to incorporate and use one or more aspects of the present invention.

Referring to FIG. 14, an exemplary processor embodiment is depicted for processor 1206. Typically one or more levels of cache 1403 are employed to buffer memory blocks in order to improve processor performance. The cache 1403 is a high speed buffer holding cache lines of memory data that are likely to be used. Typical cache lines are 64, 128 or 256 bytes of memory data. Separate caches are often employed for caching instructions than for caching data. Cache coherence (synchronization of copies of lines in memory and the caches) is often provided by various "snoop" algorithms well known in the art. Main memory storage 1205 of a processor system is often referred to as a cache. In a processor system having 4 levels of cache 1403, main storage 1205 is sometimes referred to as the level 5 (L5) cache since it is typically faster and only holds a portion of the non-volatile storage (DASD, tape etc) that is available to a computer system. Main storage 1205

"caches" pages of data paged in and out of the main storage 1205 by the operating system.

A program counter (instruction counter) 1411 keeps track of the address of the current instruction to be executed. A program counter in a z/Architecture® processor is 64 bits and can be truncated to 31 or 24 bits to support prior addressing limits. A program counter is typically embodied in a PSW (program status word) of a computer such that it persists during context switching. Thus, a program in progress, having a program counter value, may be interrupted by, for example, the operating system (context switch from the program environment to the operating system environment). The PSW of the program maintains the program counter value while the program is not active, and the program counter (in the PSW) of the operating system is used while the operating system is executing. Typically, the program counter is incremented by an amount equal to the number of bytes of the current instruction. RISC (Reduced Instruction Set Computing) instructions are typically fixed length while CISC (Complex Instruction Set Computing) instructions are typically variable length. Instructions of the IBM z/Architecture® are CISC instructions having a length of 2, 4 or 6 bytes. The Program counter 1411 is modified by either a context switch operation or a branch taken operation of a branch instruction for example. In a context switch operation, the current program counter value is saved in the program status word along with other state information about the program being executed (such as condition codes), and a new program counter value is loaded pointing to an instruction of a new program module to be executed. A branch taken operation is performed in order to permit the program to make decisions or loop within the program by loading the result of the branch instruction into the program counter 1411.

Typically an instruction fetch unit 1405 is employed to fetch instructions on behalf of the processor 1206. The fetch unit either fetches "next sequential instructions", target instructions of branch taken instructions, or first instructions of a program following a context switch. Modern Instruction fetch units often employ prefetch techniques to speculatively prefetch instructions based on the likelihood that the prefetched instructions might be used. For example, a fetch unit may fetch 16 bytes of instruction that includes the next sequential instruction and additional bytes of further sequential instructions.

The fetched instructions are then executed by the processor 1206. In an embodiment, the fetched instruction(s) are passed to a dispatch unit 1406 of the fetch unit. The dispatch unit decodes the instruction(s) and forwards information about the decoded instruction(s) to appropriate units 1407, 1408, 1410. An execution unit 1407 will typically receive information about decoded arithmetic instructions from the instruction fetch unit 1405 and will perform arithmetic operations on operands according to the opcode of the instruction. Operands are provided to the execution unit 1407 preferably either from memory 1205, architected registers 1409 or from an immediate field of the instruction being executed. Results of the execution, when stored, are stored either in memory 1205, registers 1409 or in other machine hardware (such as control registers, PSW registers and the like).

Figure 15A:
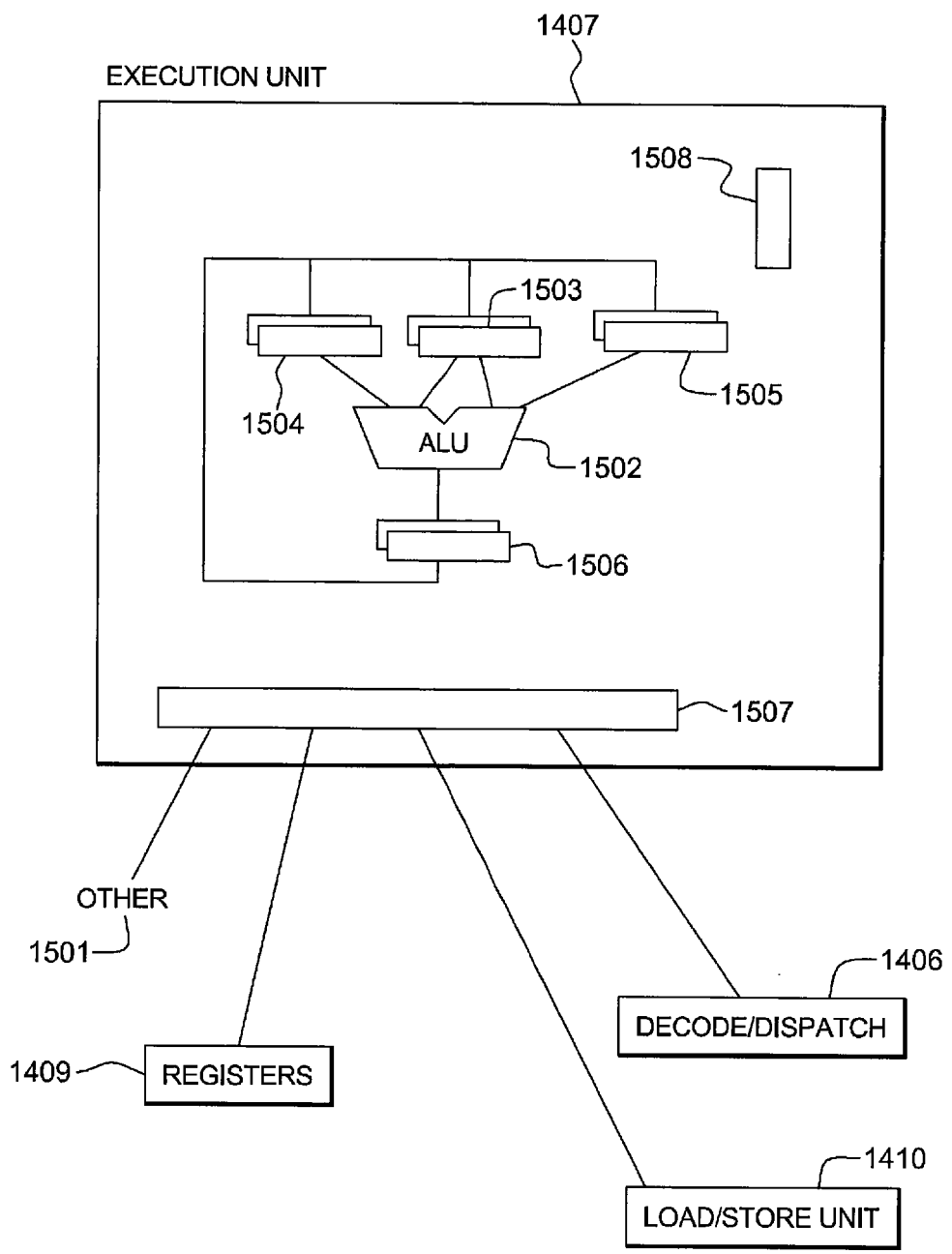
FIG. 15A depicts one embodiment of the execution unit of the computer system of FIG. 14 to incorporate and use one or more aspects of the present invention.

A processor 1206 typically has one or more units 1407, 1408, 1410 for executing the function of the instruction. Referring to FIG. 15A, an execution unit 1407 may communicate with architected general registers 1409, a decode/dispatch unit 1406, a load store unit 1410, and other 1501 processor units by way of interfacing logic 1507. An execution unit 1407 may employ several register circuits 1503, 1504, 1505 to hold information that the arithmetic logic unit (ALU) 1502 will operate on. The ALU performs arithmetic operations such as add, subtract, multiply and divide as well as logical function such as and, or and exclusive-or (XOR), rotate and shift. Preferably the ALU supports specialized operations that are design dependent. Other circuits may provide other architected facilities 1508 including condition codes and recovery support logic for example. Typically the result of an ALU operation is held in an output register circuit 1506 which can forward the result to a variety of other processing functions. There are many arrangements of processor units, the present description is only intended to provide a representative understanding of one embodiment.

An ADD instruction for example would be executed in an execution unit 1407 having arithmetic and logical functionality while a floating point instruction for example would be executed in a floating point execution having specialized floating point capability. Preferably, an execution unit operates on operands identified by an instruction by performing an opcode defined function on the operands. For example, an ADD instruction may be executed by an execution unit 1407 on operands found in two registers 1409 identified by register fields of the instruction.

The execution unit 1407 performs the arithmetic addition on two operands and stores the result in a third operand where the third operand may be a third register or one of the two source registers. The execution unit preferably utilizes an Arithmetic Logic Unit (ALU) 1502 that is capable of performing a variety of logical functions such as Shift, Rotate, And, Or and XOR as well as a variety of algebraic functions including any of add, subtract, multiply, divide. Some ALUs 1502 are designed for scalar operations and some for floating point. Data may be Big Endian (where the least significant byte is at the highest byte address) or Little Endian (where the least significant byte is at the lowest byte address) depending on architecture. The IBM z/Architecture® is Big Endian. Signed fields may be sign and magnitude, 1's complement or 2's complement depending on architecture. A 2's complement number is advantageous in that the ALU does not need to design a subtract capability since either a negative value or a positive value in 2's complement requires only an addition within the ALU. Numbers are commonly described in shorthand, where a 12 bit field defines an address of a 4,096 byte block and is commonly described as a 4 Kbyte (Kilo-byte) block, for example.

Figure 15B:
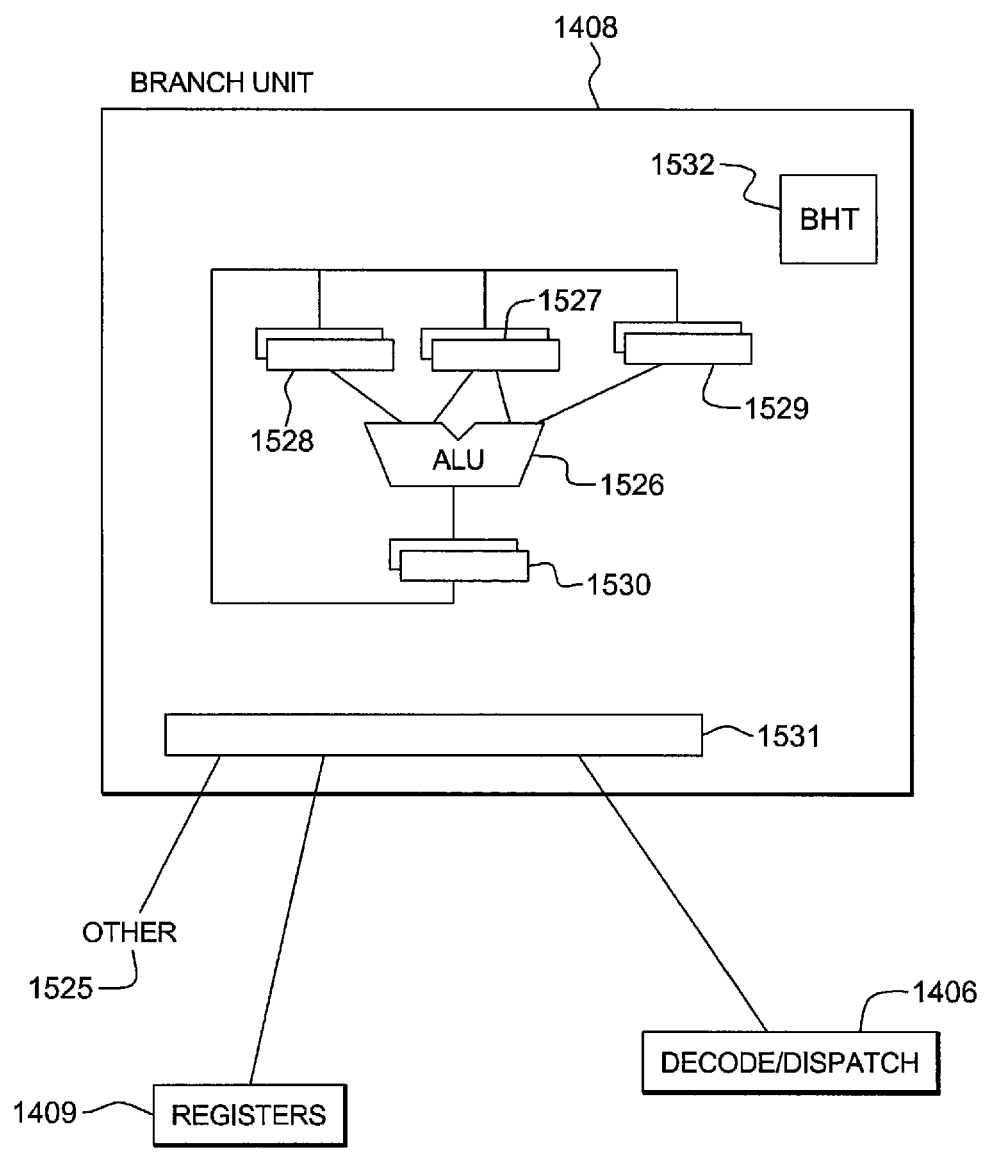
FIG. 15B depicts one embodiment of the branch unit of the computer system of FIG. 14 to incorporate and use one or more aspects of the present invention.

Referring to FIG. 15B, branch instruction information for executing a branch instruction is typically sent to a branch unit 1408 which often employs a branch prediction algorithm such as a branch history table 1532 to predict the outcome of the branch before other conditional operations are complete. The target of the current branch instruction will be fetched and speculatively executed before the conditional operations are complete. When the conditional operations are completed the speculatively executed branch instructions are either completed or discarded based on the conditions of the conditional operation and the speculated outcome. A typical branch instruction may test condition codes and branch to a target address if the condition codes meet the branch requirement of the branch instruction, a target address may be calculated based on several numbers including ones found in register fields or an immediate field of the instruction for example. The branch unit 1408 may employ an ALU 1526 having a plurality of input register circuits 1527, 1528, 1529 and an output register circuit 1530. The branch unit 1408 may communicate with general registers 1409, decode dispatch unit 1406 or other circuits 1525, for example.

The execution of a group of instructions can be interrupted for a variety of reasons including a context switch initiated by an operating system, a program exception or error causing a context switch, an I/O interruption signal causing a context switch or multi-threading activity of a plurality of programs (in a multi-threaded environment), for example. Preferably a context switch action saves state information about a currently executing program and then loads state information about another program being invoked. State information may be saved in hardware registers or in memory for example. State information preferably comprises a program counter value pointing to a next instruction to be executed, condition codes, memory translation information and architected register content. A context switch activity can be exercised by hardware circuits, application programs, operating system programs or firmware code (microcode, pico-code or licensed internal code (LIC)) alone or in combination.

A processor accesses operands according to instruction defined methods. The instruction may provide an immediate operand using the value of a portion of the instruction, may provide one or more register fields explicitly pointing to either general purpose registers or special purpose registers (floating point registers for example). The instruction may utilize implied registers identified by an opcode field as operands. The instruction may utilize memory locations for operands. A memory location of an operand may be provided by a register, an immediate field, or a combination of registers and immediate field as exemplified by the z/Architecture® long displacement facility wherein the instruction defines a base register, an index register and an immediate field (displacement field) that are added together to provide the address of the operand in memory for example. Location herein typically implies a location in main memory (main storage) unless otherwise indicated.

Figure 15C:
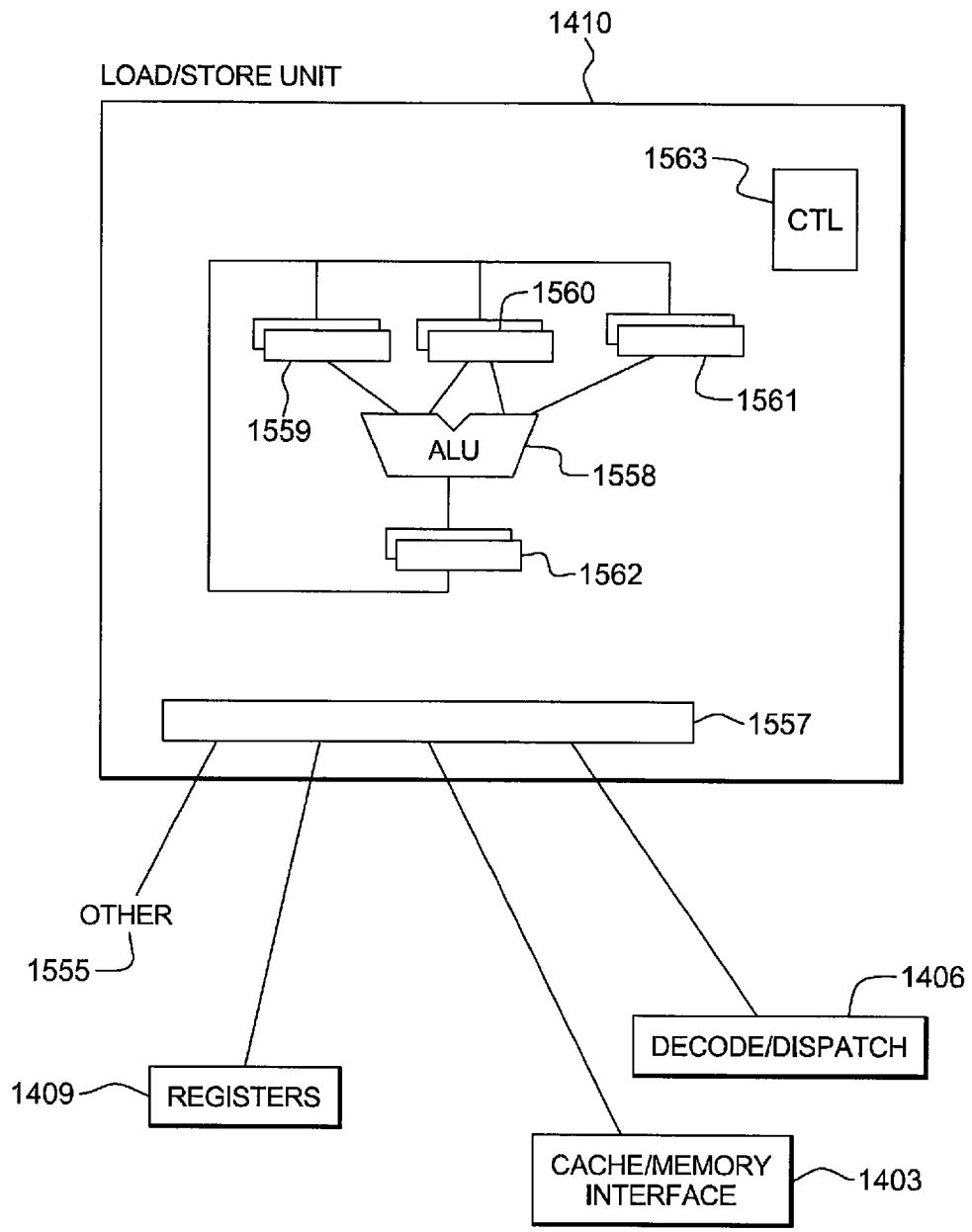
FIG. 15C depicts one embodiment of the load/store unit of the computer system of FIG. 14 to incorporate and use one or more aspects of the present invention.

Referring to FIG. 15C, a processor accesses storage using a load/store unit 1410. The load/store unit 1410 may perform a load operation by obtaining the address of the target operand in memory 1403 and loading the operand in a register 1409 or another memory 1403 location, or may perform a store operation by obtaining the address of the target operand in memory 1403 and storing data obtained from a register 1409 or another memory 1403 location in the target operand location in memory 1403. The load/store unit 1410 may be speculative and may access memory in a sequence that is out-of-order relative to instruction sequence, however the load/store unit 1410 is to maintain the appearance to programs that instructions were executed in order. A load/store unit 1410 may communicate with general registers 1409, decode/dispatch unit 1406, cache/memory interface 1403 or other elements 1555 and comprises various register circuits, ALUs 1558 and control logic 1563 to calculate storage addresses and to provide pipeline sequencing to keep operations in-order. Some operations may be out of order but the load/store unit provides functionality to make the out of order operations to appear to the program as having been performed in order, as is well known in the art.

Preferably addresses that an application program "sees" are often referred to as virtual addresses. Virtual addresses are sometimes referred to as "logical addresses" and "effective addresses". These virtual addresses are virtual in that they are redirected to physical memory location by one of a variety of dynamic address translation (DAT) technologies including, but not limited to, simply prefixing a virtual address with an offset value, translating the virtual address via one or more translation tables, the translation tables preferably comprising at least a segment table and a page table alone or in combination, preferably, the segment table having an entry pointing to the page table. In the z/Architecture®, a hierarchy of translation is provided including a region first table, a region second table, a region third table, a segment table and an optional page table. The performance of the address translation is often improved by utilizing a translation lookaside buffer (TLB) which comprises entries mapping a virtual address to an associated physical memory location. The entries are created when the DAT translates a virtual address using the translation tables. Subsequent use of the virtual address can then utilize the entry of the fast TLB rather than the slow sequential translation table accesses. TLB content may be managed by a variety of replacement algorithms including LRU (Least Recently used).

In the case where the processor is a processor of a multiprocessor system, each processor has responsibility to keep shared resources, such as I/O, caches, TLBs and memory, interlocked for coherency. Typically, "snoop" technologies will be utilized in maintaining cache coherency. In a snoop environment, each cache line may be marked as being in any one of a shared state, an exclusive state, a changed state, an invalid state and the like in order to facilitate sharing.

I/O units 1404 (FIG. 14) provide the processor with means for attaching to peripheral devices including tape, disc, printers, displays, and networks for example. I/O units are often presented to the computer program by software drivers. In mainframes, such as the z/Series® from IBM®, channel adapters and open system adapters are I/O units of the mainframe that provide the communications between the operating system and peripheral devices.

Further, other types of computing environments can benefit from one or more aspects of the present invention. As an example, an environment may include an emulator (e.g., software or other emulation mechanisms), in which a particular architecture (including, for instance, instruction execution, architected functions, such as address translation, and architected registers) or a subset thereof is emulated (e.g., on a native computer system having a processor and memory). In such an environment, one or more emulation functions of the emulator can implement one or more aspects of the present invention, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to fetch instructions from memory and to optionally, provide local buffering for the fetched instruction; an instruction decode unit to receive the fetched instructions and to determine the type of instructions that have been fetched; and an instruction execution unit to execute the instructions. Execution may include loading data into a register from memory; storing data back to memory from a register; or performing some type of arithmetic or logical operation, as determined by the decode unit. In one example, each unit is implemented in software. For instance, the operations being performed by the units are implemented as one or more subroutines within emulator software.

More particularly, in a mainframe, architected machine instructions are used by programmers, usually today "C" programmers, often by way of a compiler application. These instructions stored in the storage medium may be executed natively in a z/Architecture® IBM® Server, or alternatively in machines executing other architectures. They can be emulated in the existing and in future IBM® mainframe servers and on other machines of IBM® (e.g. pSeries® Servers and xSeries® Servers). They can be executed in machines running Linux on a wide variety of machines using hardware manufactured by IBM®, Intel®, AMD™, Sun Microsystems and others. Besides execution on that hardware under a z/Architecture®, Linux can be used as well as machines which use emulation by Hercules, UMX, or FSI (Fundamental Software, Inc), where generally execution is in an emulation mode. In emulation mode, emulation software is executed by a native processor to emulate the architecture of an emulated processor.

The native processor typically executes emulation software comprising either firmware or a native operating system to perform emulation of the emulated processor. The emulation software is responsible for fetching and executing instructions of the emulated processor architecture. The emulation software maintains an emulated program counter to keep track of instruction boundaries. The emulation software may fetch one or more emulated machine instructions at a time and convert the one or more emulated machine instructions to a corresponding group of native machine instructions for execution by the native processor. These converted instructions may be cached such that a faster conversion can be accomplished. Notwithstanding, the emulation software is to maintain the architecture rules of the emulated processor architecture so as to assure operating systems and applications written for the emulated processor operate correctly. Furthermore, the emulation software is to provide resources identified by the emulated processor architecture including, but not limited to, control registers, general purpose registers, floating point registers, dynamic address translation function including segment tables and page tables for example, interrupt mechanisms, context switch mechanisms, Time of Day (TOD) clocks and architected interfaces to I/O subsystems such that an operating system or an application program designed to run on the emulated processor, can be run on the native processor having the emulation software.

A specific instruction being emulated is decoded, and a subroutine is called to perform the function of the individual instruction. An emulation software function emulating a function of an emulated processor is implemented, for example, in a "C" subroutine or driver, or some other method of providing a driver for the specific hardware as will be within the skill of those in the art after understanding the description of the preferred embodiment. Various software and hardware emulation patents including, but not limited to U.S. Pat. No. 5,551,013, entitled "Multiprocessor for Hardware Emulation", by Beausoleil et al., and U.S. Pat. No. 6,009,261, entitled "Preprocessing of Stored Target Routines for Emulating Incompatible Instructions on a Target Processor", by Scalzi et al; and U.S. Pat. No. 5,574,873, entitled "Decoding Guest Instruction to Directly Access Emulation Routines that Emulate the Guest Instructions", by Davidian et al; U.S. Pat. No. 6,308,255, entitled "Symmetrical Multiprocessing Bus and Chipset Used for Coprocessor Support Allowing Non-Native Code to Run in a System", by Gorishek et al; and U.S. Pat. No. 6,463,582, entitled "Dynamic Optimizing Object Code Translator for Architecture Emulation and Dynamic Optimizing Object Code Translation Method", by Lethin et al; and U.S. Pat. No. 5,790,825, entitled "Method for Emulating Guest Instructions on a Host Computer Through Dynamic Recompilation of Host Instructions", by Eric Traut; and many others, illustrate the a variety of known ways to achieve emulation of an instruction format architected for a different machine for a target machine available to those skilled in the art.

Figure 16:
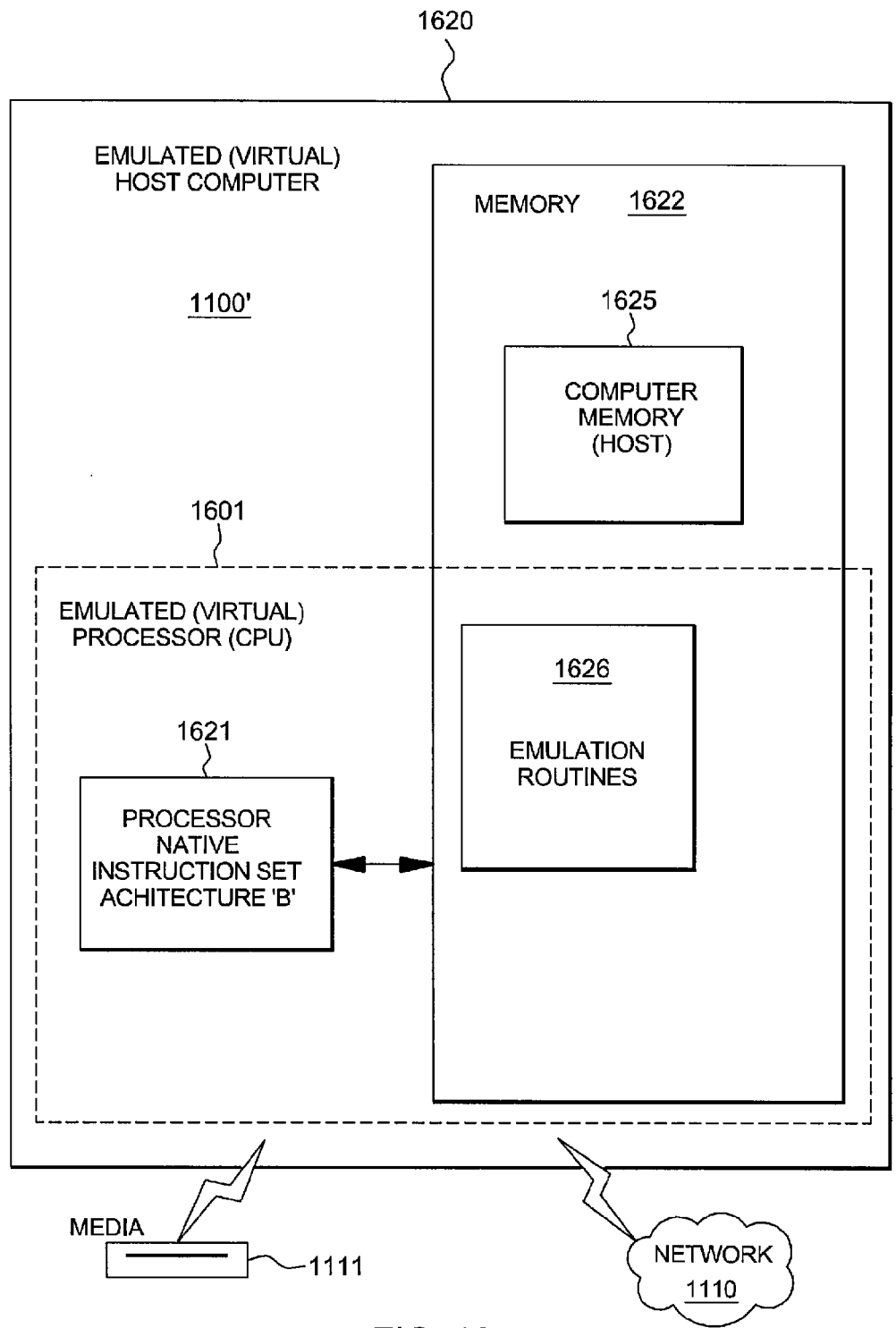
FIG. 16 depicts one embodiment of an emulated host computer system to incorporate and use one or more aspects of the present invention.

In FIG. 16, an example of an emulated host computer system 1620 is provided that emulates a host computer system 1100' of a host architecture. In the emulated host computer system 1620, the host processor (CPU) 1601 is an emulated host processor (or virtual host processor) and comprises an emulation processor 1621 having a different native instruction set architecture than that of the processor 1601 of the host computer 1100'. The emulated host computer system 1620 has memory 1622 accessible to the emulation processor 1621. In the example embodiment, the memory 1622 is partitioned into a host computer memory 1625 portion and an emulation routines 1626 portion. The host computer memory 1625 is available to programs of the emulated host computer 1620 according to host computer architecture. The emulation processor 1621 executes native instructions of an architected instruction set of an architecture other than that of the emulated processor 1601, the native instructions obtained from emulation routines memory 1626, and may access a host instruction for execution from a program in host computer memory 1625 by employing one or more instruction(s) obtained in a sequence & access/decode routine which may decode the host instruction(s) accessed to determine a native instruction execution routine for emulating the function of the host instruction accessed. Other facilities that are defined for the host computer system 1100' architecture may be emulated by architected facilities routines, including such facilities as general purpose registers, control registers, dynamic address translation and I/O subsystem support and processor cache, for example. The emulation routines may also take advantage of functions available in the emulation processor 1621 (such as general registers and dynamic translation of virtual addresses) to improve performance of the emulation routines. Special hardware and off-load engines may also be provided to assist the processor 1621 in emulating the function of the host computer 1100'.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiment with various modifications as are suited to the particular use contemplated.

What is claimed is:

1. A method of facilitating processing in a computing environment having a plurality of processors, the method comprising:

executing by a processor of the computing environment a machine instruction, the machine instruction specifying a nonquiescing control (NQ) to control whether a quiescing, operation is to be performed, a storage key, and one or more values to be used to set the storage key, the storage key being associated with a block of storage, and wherein the executing comprises:
- based on the NQ being a first value indicating that a quiescing operation is to be performed, performing a)-c) comprising:
  - a) initiating quiesce of other processors of the computing environment capable of accessing said storage key during execution of the machine instruction;
  - b) based on the other processors reaching a quiesce point, storing at least one value of the one or more values in the storage key associated with the block of main storage; and
  - c) initiating an end to the quiesce; and
- based on the NQ being a second value indicating that a quiescing operation is not to be performed, storing at least one value of the one or more values in the storage key associated with the block of main storage absent quiescing other processors of the computing environment capable of accessing said storage key, the at least one value changing at least one of an access control component and a fetch protection component of the storage key.

2. The method of claim 1, further comprising determining one of a plurality of processing modes for the request, wherein the plurality of processing modes comprises quiesce and non-quiesce, and wherein the determining is based on the nonquiescing control specified in the machine instruction.

3. The method of claim 1, wherein the instruction is a Set Storage Key Extended instruction comprising a mask field, said mask field comprising the non-quiescing control, a reference bit update mask and a change bit update mask, and wherein the Set Storage Key Extended instruction comprises a first register designation designating a first register comprising the one or more values, and a second register designation designating a second register having an address of the storage key.

4. The method of claim 1, wherein the instruction comprises a Perform Frame Management Function instruction.

5. The method of claim 1, further comprising:
- initiating, by another processor of the plurality of processors, an operation to access the block of storage;
- determining, subsequent to the initiating, that the storage key for that block of storage has changed; and
- continuing execution of the operation, based on to the determining.

6. The method of claim 5, further comprising:
- obtaining permission to access the block of storage, based on the initiating; and
- continuing execution of the operation, subsequent to a change of the storage key, based on the permission obtained based on the initiating.

7. The method of claim 6, wherein the obtaining permission comprises:
- pretesting one or more storage locations to be accessed by the operation, based on the initiating, to determine whether access is permitted; and
- obtaining permission, based on successful pretesting, wherein permission is obtained for a range of storage locations.

8. The method of claim 5, wherein the continuing execution comprises blocking a protection exception.

9. The method of claim 8, wherein the continuing execution comprises:
- deciding, based on determining the storage key has changed, whether an indicator to specify continued execution, set based on modifying a selected block of storage, specifies that execution can continue despite a changed storage key; and
- blocking the protection exception, based on the deciding indicating execution can continue.

10. The method of claim 1, wherein based on changing the storage key, multiple different values of the storage key are observable by one or more processors.

11. The method of claim 1, wherein the machine instruction is emulated by the processor.

12. A method of facilitating processing in a computing environment having a plurality of processors, the method comprising:
- executing by a processor of the computing environment a machine instruction, the machine instruction specifying an opcode to designate the machine instruction, a non-quiescing control (NQ) separate from the opcode to control whether a quiescing operation is to be performed, a storage key, and one or more values to be used to set the storage key, the storage key being associated with a block of storage, and wherein the executing comprises:
  - based on the NQ being a first value indicating that a quiescing operation is to be performed, performing a)-c) comprising:
    - a) initiating quiesce of other processors of the computing environment capable of accessing said storage key during execution of the machine instruction;
    - b) based on the other processors reaching a quiesce point, storing at least one value of the one or more values in the storage key associated with the block of storage; and
    - c) initiating an end to the quiesce; and
  - based on the NQ being a second value indicating that a quiescing operation is not to be performed, storing at least one value of the one or more values in the storage key associated with the block of storage absent quiescing other processors of the computing environment capable of accessing said storage key, wherein the storage key is updated by the storing absent quiescing the other processors irrespective of which one or more fields of the storage key are to be updated.

13. The method of claim 12, wherein the storing the at least one value changes at least one of an access control component and a fetch protection component of the storage key.

14. The method of claim 12, wherein the instruction is a Set Storage Key Extended instruction comprising a mask field, said mask field comprising the nonquiescing control, a reference bit update mask and a change bit update mask, and wherein the Set Storage Key Extended instruction comprises a first register designation designating a first register comprising the one or more values, and a second register designation designating a second register having an address of the storage key.

15. The method of claim 12, wherein the instruction comprises a Perform Frame Management Function instruction.

* * * * *